United States Patent
Sauerbeck et al.

(10) Patent No.: US 11,285,425 B2
(45) Date of Patent: Mar. 29, 2022

(54) LOW-PRESSURE DROP STRUCTURE OF PARTICLE ADSORBENT BED FOR ADSORPTION GAS SEPARATION PROCESS

(71) Applicant: CLIMEWORKS AG, Zurich (CH)

(72) Inventors: Sebastian Sauerbeck, Zurich (CH); Christoph Gebald, Zurich (CH); Jan André Wurzbacher, Zurich (CH)

(73) Assignee: CLIMEWORKS AG, Zurich (CH)

( * ) Notice: Subject to any disclaimer, the term of this patent is extended or adjusted under 35 U.S.C. 154(b) by 56 days.

(21) Appl. No.: 16/610,718

(22) PCT Filed: May 8, 2018

(86) PCT No.: PCT/EP2018/061801
§ 371 (c)(1),
(2) Date: Nov. 4, 2019

(87) PCT Pub. No.: WO2018/210617
PCT Pub. Date: Nov. 22, 2018

(65) Prior Publication Data
US 2020/0391153 A1    Dec. 17, 2020

Related U.S. Application Data

(63) Continuation-in-part of application No. 15/667,399, filed on Aug. 2, 2017, now Pat. No. 10,427,086.

(30) Foreign Application Priority Data

May 15, 2017    (EP) .................................. 17 171 005

(51) Int. Cl.
*B01D 53/04*    (2006.01)
*F28F 1/12*    (2006.01)
(Continued)

(52) U.S. Cl.
CPC ..... *B01D 53/0415* (2013.01); *B01D 53/0407* (2013.01); *B01D 53/0438* (2013.01);
(Continued)

(58) Field of Classification Search
CPC ............ B01D 53/0407; B01D 53/0438; B01D 53/0415; B01D 53/0454; B01D 53/0462;
(Continued)

(56) References Cited

U.S. PATENT DOCUMENTS 3,354,623 A * 11/1967 Keller .................. B01D 46/125
55/484
3,873,287 A * 3/1975 Barnebey ............... B01D 46/30
96/129

(Continued)

FOREIGN PATENT DOCUMENTS

EP    0 766 993 A2    4/1997
EP    17201080.3    11/2017
(Continued)

OTHER PUBLICATIONS

International Search Report for PCT/EP2018/061801 dated Aug. 6, 2018 (PCT/ISA/210).
(Continued)

*Primary Examiner* — Frank M Lawrence, Jr.
(74) *Attorney, Agent, or Firm* — Sughrue Mion, PLLC

(57) ABSTRACT

A gas separation unit for the separation of a first gas, carbon dioxide, from a mixture, by using an adsorption/desorption process using a loose particulate sorbent material arranged in at least two stacked layers. The primary heat exchange piping is arranged on the two outer edges of the layer within the cavity extending along a longitudinal direction. Further, an essentially parallel array of secondary heat exchange pipes is provided, the secondary heat exchange pipes extending along a transverse direction. The first diameter of (Continued)

the secondary heat exchange pipes is at least twice as large as the second outer diameter of the secondary heat exchange pipes and the secondary heat exchange pipes are in thermal contact with sheets of metal which extend oscillating between pairwise adjacent secondary heat exchange pipes.

31 Claims, 12 Drawing Sheets

(51) Int. Cl.
    *F28F 1/32*    (2006.01)
    *B01J 20/24*    (2006.01)
    *B01J 20/28*    (2006.01)
    *F28F 9/26*    (2006.01)

(52) U.S. Cl.
    CPC .......... *B01D 53/0462* (2013.01); *B01J 20/24* (2013.01); *B01J 20/28004* (2013.01); *B01J 20/28023* (2013.01); *B01J 20/28052* (2013.01); *F28F 1/126* (2013.01); *F28F 1/32* (2013.01); *F28F 9/26* (2013.01); *B01D 2253/20* (2013.01); *B01D 2253/25* (2013.01); *B01D 2253/34* (2013.01); *B01D 2257/504* (2013.01); *B01D 2258/0283* (2013.01); *B01D 2258/06* (2013.01); *F28F 2255/12* (2013.01); *Y02C 20/40* (2020.08)

(58) Field of Classification Search
    CPC ............ B01D 2253/20; B01D 2253/25; B01D 2253/34; B01D 2257/504; B01D 2258/02; B01D 2258/0283; B01D 2258/06; B01J 20/24; B01J 20/28004; B01J 20/28023; B01J 20/28052; B01J 20/20; B01J 20/25; B01J 20/302; B01J 20/34; F28F 1/126; F28F 1/32; F28F 2255/12; F28F 9/26; Y02C 10/08

USPC ............ 96/121, 129, 130, 134, 146; 95/139
See application file for complete search history.

(56) References Cited

U.S. PATENT DOCUMENTS

| | | | |
|---|---|---|---|
| 6,533,847 B2* | 3/2003 | Seguin | B01D 53/0415 |
| | | | 55/518 |
| 8,163,066 B2 | 4/2012 | Eisenberger | |
| 8,202,350 B2 | 6/2012 | Asaro et al. | |
| 2009/0120288 A1 | 5/2009 | Lackner et al. | |
| 2011/0146487 A1* | 6/2011 | Celik | B01D 53/0407 |
| | | | 95/96 |
| 2012/0152116 A1* | 6/2012 | Barclay | C07C 7/12 |
| | | | 95/113 |
| 2012/0174778 A1 | 7/2012 | Eisenberger | |

FOREIGN PATENT DOCUMENTS

| | | |
|---|---|---|
| EP | 18157300.7 | 2/2018 |
| JP | 08-178462 A | 7/1996 |
| JP | 08-247575 A | 9/1996 |
| JP | 10-089805 A | 4/1998 |
| JP | 10-103811 A | 4/1998 |
| JP | 10-122699 A | 5/1998 |
| WO | 2010/022339 A2 | 2/2010 |
| WO | 2010/027929 A1 | 3/2010 |
| WO | 2010/091831 A1 | 8/2010 |
| WO | 2012/168346 A1 | 12/2012 |
| WO | 2014/170184 A1 | 10/2014 |

OTHER PUBLICATIONS

Written Opinion for PCT/EP2018/061801 dated Aug. 6, 2018 (PCT/ISA/237).

\* cited by examiner a)

b)

a)

b)

c)

g)

h)

i)

a)

b)

LOW-PRESSURE DROP STRUCTURE OF PARTICLE ADSORBENT BED FOR ADSORPTION GAS SEPARATION PROCESS

CROSS REFERENCE TO RELATED APPLICATIONS

This application is a National Stage of International Application No. PCT/EP2018/061801 filed May 8, 2018, claiming priority based on European Patent Application No. 17 171 005.6 filed May 15, 2017 and U.S. patent application Ser. No. 15/667,399 filed on Aug. 2, 2017.

TECHNICAL FIELD

The present invention relates to sorbent bed structures for gas separation processes and the use of such structures for gas separation, for example for the separation/capture of $CO_2$ from gas streams.

PRIOR ART

Gas separation by adsorption has many different applications in industry, for example removing a specific component from a gas stream, where the desired product can either be the component removed from the stream, the remaining depleted stream, or both. Thereby both, trace components as well as major components of the gas stream can be targeted by the adsorption process.

One important application is capturing carbon dioxide ($CO_2$) from gas streams, e.g., from flue gases, exhaust gases, industrial waste gases, biogas or atmospheric air.

Capturing $CO_2$ directly from the atmosphere, referred to as direct air capture (DAC), is one of several means of mitigating anthropogenic greenhouse gas emissions and has attractive economic perspectives as a non-fossil, location-independent $CO_2$ source for the commodity market and for the production of synthetic fuels. The specific advantages of $CO_2$ capture from the atmosphere include:

(i) DAC can address the emissions of distributed sources (e.g. cars, planes), which account for a large portion of the worldwide greenhouse gas emissions and can currently not be captured at the site of emission in an economically feasible way;

(ii) DAC can address emissions from the past and can therefore create truly negative emissions;

(iii) DAC systems do not need to be attached to the source of emission but are rather location independent and can for example be located at the site of further $CO_2$ processing; and (iv) if $CO_2$ that was captured from the atmosphere is used for the production of synthetic hydrocarbon fuels from renewable energy sources, truly non-fossil fuels for the transportation sector can be obtained, that create no or very few net $CO_2$ emissions to the atmosphere.

Several DAC methods have recently been developed based on various technological approaches. For example, U.S. Pat. No. B-8,163,066 discloses carbon dioxide capture/regeneration structures and techniques; US-A-2009/0120288 discloses a method for removal of carbon dioxide from air; US-A-2012/0174778 discloses a carbon dioxide capture/regeneration method using a vertical elevator; and WO-A-2010022339 discloses a carbon dioxide capture method and facility.

One particular approach is based on a cyclic adsorption/desorption process on solid, chemically functionalized sorbent materials. For example, in WO-A-2010/091831 a structure based on amine functionalized solid sorbent materials together with a cyclic adsorption/desorption process using this material for the extraction of carbon dioxide from ambient air is disclosed. Therein, the adsorption process takes place at ambient conditions at which air is streamed through the sorbent material and a portion of the $CO_2$ contained in the air is chemically bound at the amine functionalized surface of the sorbent, During the subsequent desorption, the material is heated to about 50-110° C. and the partial pressure of carbon dioxide surrounding the sorbent is reduced by applying a vacuum or exposing the sorbent to a purge gas flow. Thereby, the previously captured carbon dioxide is removed from the sorbent material and obtained in a concentrated farm.

In WO-A-2012/168346, a sorbent material based on amine functionalized cellulose is disclosed, which can be used for the above described process.

Also possible are sorbent materials based on $K_2CO_3$ or more generally particulate activated carbon impregnated with at least one alkali carbonate salt selected from the group consisting of: $K_2CO_3$, $Li_2CO_3$, $Na_2CO_3$ as well as mixed salts thereof, as e.g. disclosed in EP 17 201 080.3 and 18 157 300.7.

Generally, for adsorption-based gas separation processes, configurations of the sorbent material are desired which impose little pressure drop on the gas flow in order to minimize the energy required for gas pumping and at the same time achieve maximum contact between the sorbent and the gas stream in order to maximize the mass transfer rates of the components to be removed from the gas stream. Typical configurations include packed bed columns or fluidized beds with typical lengths of several ten centimeters to several meters, which typically impose pressure drops of several thousand Pascal up to several bars on the gas flow.

The requirement on the pressure drop can become even more severe, if trace components are removed from a gas stream. In particular, all DAC approaches have one major challenge in common which are the very large air volumes that have to be passed through any capture system in order to extract a certain amount of $CO_2$ from the air. The reason for this is the very low concentration of $CO_2$ in the atmospheric air, currently between 390 and 400 ppm, i.e., roughly 0.04%. Thus, in order to extract one metric ton of $CO_2$ from the atmosphere, at least about 1'400'000 cubic meters of air have to be passed through the capture system. This in turn means that economically feasible capture systems must have a very low pressure drop on the air flow passing through them. Otherwise the energy requirements for air pumping will render the system uneconomical. However, any low-pressure drop configuration should not compromise the mass transfer properties of the system.

A structure that is suitable for adsorption of $CO_2$ from air but also from other gas streams such as flue gases is e.g. disclosed in WO-A-2014/170184.

While many materials that have promising properties for a DAC process are typically in a granular form, their arrangement in a conventional packed bed column or in a fluidized bed with a length of typically several ten centimeters to several meters will usually not be feasible, since the resulting pressure drops will exceed the tolerable limits by one or several orders of magnitude.

On the other hand, in the field of particle filters for gas streams, in particular soot particle filters for exhaust gases, channeled filter structures were developed, typically referred to as "wall flow" filters, see for example EP-A-0 766 993. In these structures the gas flow enters the structure through inlet channels, passes porous walls, at which the soot particles are trapped, and exits the structure through outlet channels.

Monolithic structures comprising sorbent materials were also developed in the context of gas separation and adsorption (e.g. WO-A-2010/027929, U.S. Pat. No. B-8,202,350).

Structures having a plurality of heat transfer tubes disposed parallel while being mutually spaced apart a distance from one another are also known from completely different fields such as the field of refrigerants as evidenced in JP H10 89805 A, JP H08 247575 A. JP H08 178462 A, JP H10 122699 A as well as JP H10 103811 A.

SUMMARY OF THE INVENTION

It is therefore an object of the present invention to provide an improved and more efficient gas separation unit for the separation of at least a first gas, preferably carbon dioxide, from a mixture containing said first gas as well as further gases different from the first gas, by using a cyclic adsorption/desorption process using a loose particulate sorbent material for gas adsorption.

In the gas separation unit according to the present invention said particulate sorbent material is arranged in at least two stacked layers. Each layer comprises two spaced apart parallel sheets of a flexible fabric material which flexible fabric material is gas permeable but impermeable to the loose particulate sorbent material. These sheets are arranged essentially parallel and at a distance, defining an inlet face of each layer and an outlet face of each layer. The distance of these sheets of one layer is in the range of 0.3-11 cm or 1-5 cm, and the sheets are mounted on a rectangular circumferential frame structure.

Said rectangular frame structure is including four metal profiles arranged pairwise mutually parallel, one pair along a longitudinal direction and one pair along a transverse direction, in each case with respect to the airflow through the gas separation unit. Said frame structure is enclosing, together with said two parallel sheets of flexible fabric material, a cavity, in which the particulate sorbent material is located and held in place, typically in a densely packed form.

In relation with the metal profiles it should be noted that these earl consist of metal but also of a plastic material having sufficient strength. This means that the metal profiles can for example be made of a glassfiber reinforced thermoplastic material such as polyamide or polyethylene, polycarbonate or the like. This includes the core profiles as well as the profiles wrapping around the core profiles and slats as described further below. The term metal profile therefore also includes plastic materials.

In such a stack, the frames may be oriented in planes which are essentially horizontal, adjacent frames if desired alternatingly inclined so that converging inlet paths and diverging outlet paths result. Between the layers there are therefore in this case horizontal slots for the entry of the inflow of the gas mixture and horizontal slots for the outflow of the gas depleted in CO2. Such a substantially horizontal stack configuration can be selected to avoid the formation of holes in the layers due to the motion of the sorbent material during operation. Such holes can lead to bypassing of a large portion of the main airflow as they can form a significantly lower pressure drop region.

According to one embodiment within the stiff rectangular circumferential frame structure and preferably across the heat exchange element as well as the layers of flexible fabric material, there is provided a plurality of attachment elements, preferably in the form of glue or welding or soldering or center rivet. connections or transverse or longitudinal slats affixed with any of these means for holding at least the flexible fabric material layers together (if attachment elements penetrate across the heat exchange element) to the tubing of the secondary heat exchanger or heat exchange metal sheet. This is intended to prevent sagging of the flexible fabric layers and the transport of sorbent material under the influence or airflow: both impacts improving stability of the frame structure and reducing the likelihood of hole formation.

In some cases however it has been observed that also in such a substantially horizontal configuration, hole formation can occur and a more controlled formation of holes can be realized in a vertical orientation of the stack.

Alternatively the frames may be oriented in planes which are essentially vertical, adjacent frames if desired again alternatingly inclined so that converging inlet paths and diverging outlet paths result.

According to another embodiment therefore the layers can be placed vertically—the complete stack is so to speak rotated 90° around the main horizontal axis of the whole unit. According to this embodiment, the at least two stacked layers with the particulate sorbent material, or preferably in case of more than two layers all the layers, each layer comprising two sheets of a flexible fabric material which is gas permeable but impermeable to the loose particulate sorbent material, are oriented vertically, i.e. such that the plane normals of the layers are oriented horizontally. In other words in this orientation between the layers there are vertical slots for the entry of the inflow of the gas mixture and vertical slots for the outflow of the gas depleted in CO2. In this manner any relocation motion of sorbent nevertheless leads to a homogenous bed due to the weight of the sorbent material and the corresponding downward motion of the particles which closes any formed holes in a self-ordering process. In order to avoid that formed holes at the upper edge of the layer lead to bypassing, a slat made preferably of aluminum can be affixed at the upper edge being oriented along the upper edge of the layer on the inflow and outflow face of the layer, in contact with the outer surface of the layer, covering and thereby blocking a portion of the layer—and any potentially formed holes—to inflow and thusly forcing all inflow through the sorbent material layer containing sufficient sorbent particles in this region. The width of the slat can be in the range of 1 to 15 cm, preferably 2 to 10 cm.

Also intermediate rotated stack orientations are possible, where the plane normals are oriented in a plane perpendicular to the inflow direction, e.g. orientations where the slots for the entry of the inflow of the gas mixture and slots for the outflow of the gas depleted in CO2 are between the horizontal or the vertical direction, e.g. at 45°.

Primary heat exchange piping (mainly for distribution purposes and only to a small extent for direct heat exchange) is arranged on the two lateral outer edges of the layer and preferably within the cavity, extending along said longitudinal direction and comprising at least one heat exchange fluid inlet and at least one heat exchange fluid outlet. The primary heat exchange piping may be provided as part of the metal profiles (attached thereto or the primary heat exchange piping actually forming the lateral edge profile) or as separate elements to the lateral edge profile. A first lateral outer edge heat exchange piping (upstream lateral piping) normally comprises at least one heat exchange fluid inlet and at least two or preferably a plurality of heat exchange fluid outlets (corresponding to the number of secondary heat exchange pipes), and a second lateral outer edge heat exchange piping (downstream lateral piping) comprising at least two or preferably a plurality of heat exchange fluid inlets (in number normally corresponding to the number of secondary heat exchange pipes and the number of outlets of the first lateral outer edge heat exchange piping) and at least one heat exchange fluid outlet.

Further an essentially parallel. array of secondary heat exchange pipes is provided within the cavity, each secondary heat exchange pipe fluidly connecting a first lateral outer edge heat exchange piping with a second lateral outer edge heat exchange piping on the other lateral edge of the frame, said secondary heat exchange pipes extending along said transverse direction and being spaced at a distance in the range of 0.5-5 cm between pairs of pipes. Preferably, this array of secondary heat exchange pipes is equally distributed along the longitudinal direction; normally with a distance between the pipes in the range of 0.5-4 cm. Preferably further this array of secondary heat exchange pipes is located in one common plane which is parallel to the planes of the sheets of flexible fabric material. Preferably this plane of the heat exchange pipes is essentially half way between the sheets of flexible fabric material, and most preferably the heat exchange pipes touch and are in contact with the flexible fabric material layers. They may even be attached to the flexible fabric material layers over their length, e.g. by closure by adhesive force, using a glue.

It is one of the important elements of the proposed gas separation unit that the secondary heat exchange pipes do not have a circular cross-section. Quite specifically, the first outer diameter p of the cross section of the secondary heat exchange pipes in a direction perpendicular to the plane of the layer is at least twice as large as the second outer diameter q of the cross section of the secondary heat exchange pipes in the longitudinal direction. By providing piping which is "slim" in the plane of the layer the secondary heat exchange pipes appearing like upright partitioning walls in the cavity, an essentially planar surface is provided at the face of adjacent secondary heat pipes, allowing for most efficient attachment of and heat exchange with heat exchange metal sheets and/or the sorbent as will be detailed as follows.

This design of the secondary heat exchange pipes results in two substantial advantages over prior art designs comprising corresponding heat exchange pipes with a circular cross section: First, the area that is available for gas flow through the planes of the sheets of flexible fabric material is much larger since a smaller portion of this flow cross-section area is blocked by the secondary heat exchange pipes. This results in reduced pressure drop on the gas flow. Second, the secondary heat exchange pipes can be spaced closer to each other compared to prior art designs with circular pipe cross sections while the area available for gas flow still remains larger compared to those prior art designs. This results in an optimized heat transfer design since the distances for heat transfer through the sorbent material between the secondary heat exchange pipes is reduced.

Said secondary heat exchange pipes are further in thermal contact with sheets of metal which are arranged essentially perpendicular to the main plane of the frame, and which extend oscillating between pairwise adjacent secondary heat exchange pipes, thereby contacting them for thermal contact. In other words these metal sheets are either wavy oscillating between adjacent secondary heat exchange pipes and contacting the flat small-diameter surfaces, or zigzagging between adjacent secondary heat exchange pipes and contacting the flat small-diameter surfaces.

As an alternative to the sheets of metal or in addition to these said secondary heat exchange pipes can be held in place with spacers which are arranged essentially perpendicular to the main plane of the frame, and which at least extend between pairwise adjacent secondary heat exchange pipes.

Furthermore the proposed unit preferably has a gas inlet side or gas inlet manifold through which an inflow of gas mixture enters the unit and a gas outlet side or gas outlet manifold through which a gas outflow exits the unit, the gas pathway between the inflow and the outflow being confined in the unit to pass through at least one layer.

Said layers are preferably arranged in the unit such that the inflow passes through the inlet face, subsequently through the particular sorbent material located in the cavity of the respective layer, subsequently to exit the respective layer through the outlet face to form the gas outflow.

Preferably the layers are arranged such that inlet faces of adjacent layers are facing each other enclosing gas inlet channels and such that outlet faces are facing each other enclosing gas outlet channels.

Further preferably the mean distance between inlet faces and/or outlet faces defining said channels, measured in a direction essentially perpendicular to a main gas inflow direction and a main gas outflow direction, respectively, is in the range of 0.5-25 cm or 0.5-15 cm.

According to a first preferred embodiment of the proposed gas separation unit, the first outer diameter p of the cross section of the secondary heat exchange pipes is in the range of 5-30 mm or 5-20 mm, preferably in the range of 8-15 mm, more preferably in the range of 8-12 mm.

According to yet another preferred embodiment the second outer diameter q of the cross section of the secondary heat exchange pipes, at the widest position, is in the range of 1.5-5 mm, preferably 1.8-3 mm, most preferably in the range of 2-2.5 mm.

According to yet another preferred embodiment the first outer diameter p of the cross section of the secondary heat exchange pipes is a factor of 3-20 or 3-10, preferably a factor of 3.5-5 larger than the second outer diameter q of the cross section of the secondary heat exchange pipes in the longitudinal direction.

The secondary heat exchange pipes may, according to another preferred embodiment, have an oval or essentially rectangular inner and/or outer cross section with the longer axis of the cross section extending perpendicular to the plane of the respective frame, wherein in case of a rectangular cross section preferably the outer diameter is provided with rounded edges.

The secondary heat exchange pipes may, according to another preferred embodiment, comprise a constricted area in the longitudinal direction, wherein preferably the cross section of the secondary heat exchange pipes in the longitudinal direction comprises a narrow central portion with a diameter c in the range of 0.5-3 mm, preferably in the range of 1.5-2.5 mm, and further preferably at both ends a widened portion with bulging portions extending beyond the surface of the narrow central portion and providing a preferably rounded end surface facing the flexible fabric sheets.

This particular shape of the secondary heat exchange piping allows going for a metal sheet height for the heat exchange metal sheets (lamellae) which is somewhat smaller than the height of the secondary heat exchange pipe and which is essentially covered by the respective bulging portions of the pipe cross-section profile. Like this the flexible fabric layer sheets can be protected from harm which may occur by the edges of the metal sheets if the fabric layer sheets are sagging or the like.

According to yet another preferred embodiment, the height b of the sheets of metal is therefore chosen to be smaller than the first outer diameter p, wherein preferably the height b of the sheets of metal is at least 0.3 min-3 mm, preferably 0.5-2 mm, most preferably 0.8-1.5 mm smaller than the first outer diameter p.

According to a preferred embodiment, the sheets of metal are flat, corrugated, finned and/or or perforated, in the sections spanning the space between adjacent secondary pipings.

According to a particularly preferred embodiment, the secondary heat exchange pipes comprise a narrow central portion with a diameter c in the range of 0.5-3 mm, preferably in the range of 1.5-2.5 mm, and at both ends a widened portion with bulging portions extending beyond (typically extending by 0.1-0.4 mm at each side) and over the surface of the narrow central portion and providing a preferably rounded end surface. The height b of the sheets of metal is preferably essentially the same or only somewhat smaller than the length of the narrow central portion of the secondary heat exchange pipe in a direction perpendicular to the plane of the layer.

The secondary heat exchange pipes may also comprise at least one, preferably two partition walls running essentially in the plane of the layer in the hollow interior of the secondary heat exchange pipe, preferably separating the flow path in that interior into a central flow-through channel and two end flow-through channels.

The sheets of metal preferably have a height, measured in a direction perpendicular to the plane of the respective layer, in the range of 5-15 mm, preferably in the range of 7-10 mm.

Generally speaking, the elements used for a layer, except the flexible fabric layer, are preferably made of aluminium or aluminum alloy.

The sheets of metal, preferably made of aluminum or of an aluminum alloy, can have a thickness in the range of 0.1-1 mm, preferably in the range of 0.2-0.5 mm.

The sheets of metal, preferably of aluminum or of an aluminum alloy, preferably oscillate between adjacent secondary heat exchange pipes and are soldered and/or welded to the second outer diameter wall in rounded or angular portions of the sheets of metal, wherein said rounded or angular portions are preferably joined by straight portions of the sheets of metal bridging the interspace between adjacent secondary heat exchange pipes.

Also, according to another preferred embodiment, one single sheet of metal can be provided between a pair of adjacent secondary heat exchange pipes extending, in an oscillating manner, from the first lateral edge region of a frame to the second lateral edge region of the frame.

The gas separation unit according to the present invention may further be characterized in that the primary heat exchange pipes are provided as tubes of essentially circular hollow cylindrical shape, having a diameter in the range of 5-40 or 8-35 mm, preferably in the range of 10-20 mm.

Preferably at the side facing the cavity of the respective frame, the primary heat exchange pipes are provided with an array of preferably equally spaced indentations (the same number of indentations as primary heat exchange pipes are normally provided) with oblong holes for attaching, preferably soldering and/or welding, the end openings of the respective secondary heat exchange pipes for establishment of a fluid connection of the interior of the primary heat exchange pipe with the secondary heat exchange pipe. The long axis of the oblong holes is perpendicular to the plane of the layer. Preferably, the length along the long axis of each of said oblong holes is in the range of 8-30 mm or 8-15 mm, and preferably essentially corresponds to the first outer diameter p of the secondary heat exchange pipe.

Said metal profiles circumferentially surrounding the structure, may include core profiles, preferably in the form of extruded aluminum sections, which core profiles comprise in cross section at least one groove in the top and/or bottom face, preferably running along the full length of the respective core profile, wherein preferably at one top or bottom face a first groove is provided and in the other face a second groove is provided with its opening facing the opposite direction than the first groove.

Preferably one groove is located closer to the cavity than the other groove, leading to an S-type cross section of the core profile. These grooves can be used for directly or indirectly fixing the flexible fabric material layer to the frame construction.

Preferably the fixing of the flexible fabric material layer is effected by respective clamping strips inserted into the respective groove and/or by slats attached to the top and/or bottom face of the core profile by means of fixing elements, preferably rivets, interacting with said groove, and preferably distributed along the length. of the respective metal profile, preferably at regular intervals. Profile elements can further be provided which wrap-around said core profiles and which comprise first and second arms contacting the top and bottom faces of the metal profiles. The profile elements and the core profiles in this case together form the metal profiles.

Pairs of adjacent frame structures can be provided, at the facing transverse edges contacting in. use with in one case a tongue protrusion extending over the full width of the edge, and a corresponding counter profile providing a slot also extending over the full width of the edge, such that by inserting said tongue of one frame into said slot of the adjacent frame the adjacent frame elements are mechanically fixed as well as sealed relative to each other.

Preferably said tongue protrusion is realized by means of a correspondingly structured wide slat at the same time used for fixing the flexible fabric material to the corresponding metal profile, or by means of profile elements which wrap-around said core profiles and which comprise first and second arms contacting the top and bottom faces of the core profile as well as a tongue protrusion.

Said counter profile may also comprise a slat which at the same time can be used for fixing the flexible fabric material to the corresponding metal profile of the adjacent frame or comprise a profile element which wraps around said core profile and which comprises first and second arms contacting the top and bottom faces of the core profiles and an extension providing said slot.

The longitudinal metal profiles can be provided with holding elements for stacking layers, wherein preferably these holding elements are provided as grooves opening to the upper and/or lower direction of the respective layer for taking up stack plates or for being shifted into slots in stack plates.

Preferably the stack is constructed by providing a bottom metal sheet with lateral vertical portions and horizontal bottom portion (bent over vertical edges), onto which the respective groove of the lowermost layer is shifted, followed by alternatingly two lateral stack plates and following layers, and so on, terminated on top of the stack by a top metal sheet with vertical portions and a horizontal top portion.

According to another preferred embodiment, the proposed gas separation unit comprises, on a first lateral side, an upstream first side section of the primary heat exchange piping extending essentially over half of the longitudinal length of the respective frame, and a downstream first side section extending over the remaining longitudinal length of the respective frame edge. On a second lateral side one single primary heat exchange piping is provided, and a first array of secondary heat exchange pipes fluidly connects the heat exchange path in a transverse direction between the first side section of the primary heat exchange piping with an upstream portion of the single primary heat exchange piping on the second lateral side, and a second array of secondary heat exchange pipes fluidly connects the heat exchange path in a transverse direction between the single primary heat exchange piping on the second lateral side with the downstream first side section on the first lateral side. Furthermore a heat exchange fluid inlet is provided on said upstream first side section and a heat exchange fluid outlet is provided on said downstream first side section.

The gas separation unit may further preferably comprise, in one layer, in the range of 30-70 secondary heat exchange pipes running parallel and in one plane, preferably in the range of 40-60 secondary heat exchange pipes are arranged like that, wherein preferably an upstream half of the secondary heat exchange pipes transports heat exchange fluid from a first side to a second lateral side of the respective layer, and a downstream half of the secondary heat exchange pipes transports the heat exchange fluid from the second lateral side to the first lateral side.

The flexible fabric material can be a woven or nonwoven textile material, preferably based on polymeric fibres or yarns, respectively, most preferably based on fibres or yarns, respectively based on PET and/or PE, or the flexible fabric material is made from a cellulose based material, preferably a paper material. The flexible fabric material preferably has a thickness in the range of 0.1-4 mm, preferably in the range of 0.05-4 mm, preferably in the range of 0.1-1 mm.

The flexible fabric material, preferably in the form of a polyethylene nonwoven, preferably has a gas, preferably air permeability in the range of 2500-5000 l/m2/s, preferably in the range of 3000-4000 l/m2/s. The air permeability can be determined according to EN ISO 9237:1995.

At least the upstream layer of the flexible fabric material in further preferably be chosen as a filter fabric material of at least M6 or at least F6 or at least F7 class according to DIN EN 779 or wherein additional to the upstream layer of the flexible fabric material there is provided filter fabric material of at least M6 or at least F6 or at least F7 class, preferably as the outermost layer, more preferably mounted in a exchangeable way.

Along the stack of layers the distance between adjacent layers can also be varied taking account of the pressure drop profile of the inflow, wherein preferably in case of a central inflow the distance between adjacent layers is set at a given value in the range of 8-300 mm or 8-250 mm, preferably in the range of 19-200 mm or 20-100 mm, wherein the distance of the layers within the stack is preferably gradually increasing outwardly or inwardly, respectively, to a value in the range of 8-300 mm or 8-250 mm, preferably in the range of 19-200 mm or 20-100 mm.

Also, in the stack of layers the angle of the layers to a main horizontal axis of the unit in case of a central inflow can be chosen to be gradually increasing from a value of around zero at the center to a value in the range of 0-20°, preferably in the range of 0.1-5°.

Furthermore the present invention relates to a method for producing a layer for gas separation unit according to any of the preceding claims, wherein in a first step the primary heat exchange piping, the secondary heat exchange piping, the heat exchange metal sheets, and/or the spacers extending between pairwise adjacent secondary heat exchange pipes, if needed supplemented by further structural elements are assembled and soldered and/or welded together, preferably in a soldering and/or welding furnace by providing pre-plated construction elements (pre-plated meaning that the elements, at least in the regions where they are to be joined to other elements, are provided with soldering and/or welding material prior to assembly), and wherein in a second step the circumferential edge profiles are attached to this structure, preferably by soldering or welding, wherein in a third step the bottom fabric layer is attached to the bottom surface, in a fourth step the loose particular sorbent material is introduced into the cavity, and in a fifth step the top fabric layer is attached to the top surface.

The bottom and/or top fabric layer can also not only be attached to the edge metal profiles but also on the respective end faces of the secondary heat exchange pipes, preferably by means of gluing and/or heat welding.

Last but not least the present invention relates to the use of a unit as outlined above for extracting at least carbon dioxide and/or water vapor from air and/or flue gases and/or biogas and/or other CO2-containing gas streams.

Further embodiments of the invention are laid down in the dependent claims.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Figure 1:
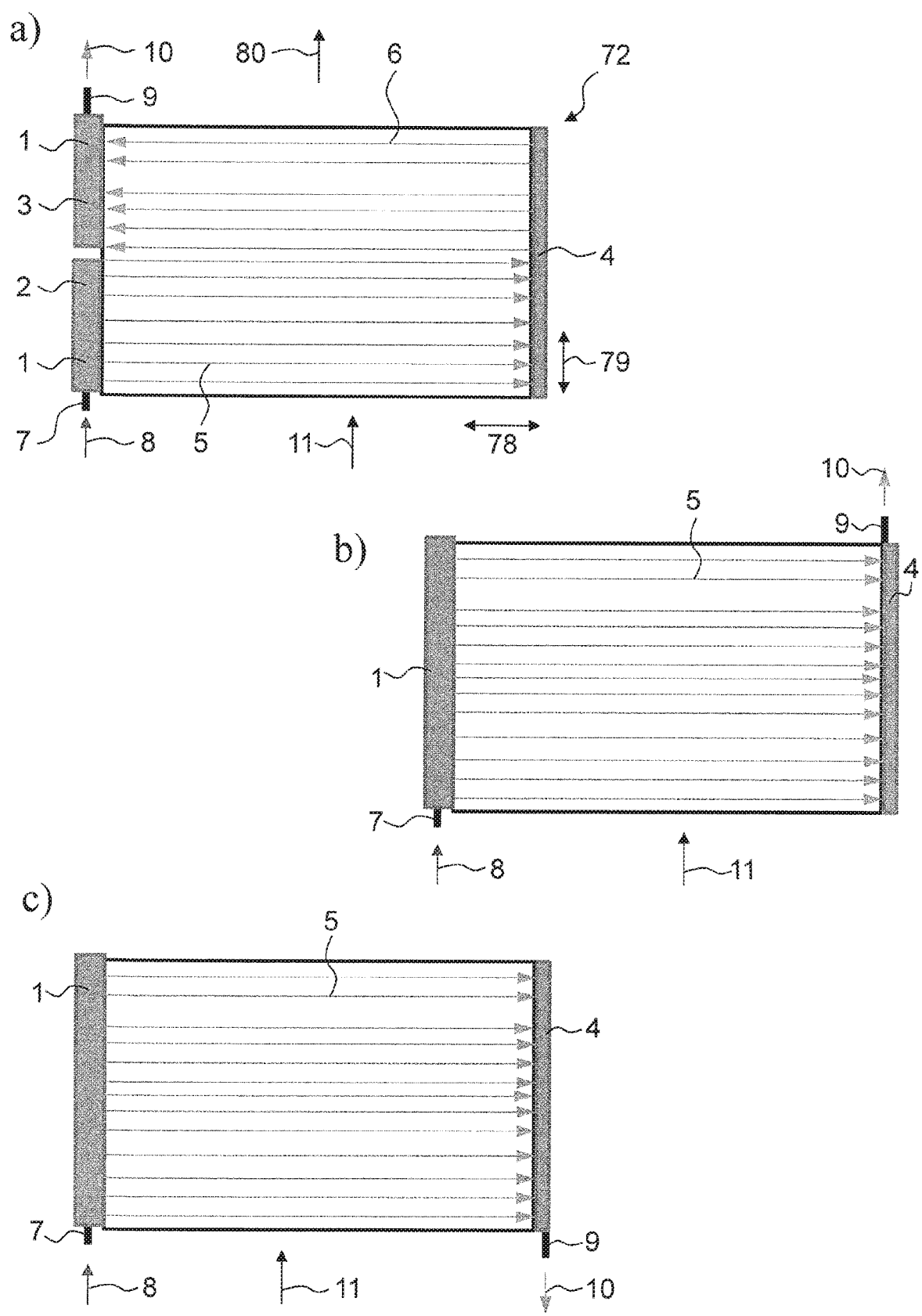
FIG. 1 shows representations of the frame structure, wherein in a) a schematic view is shown for the situation where the heat exchange medium flows along a U in the frame structure, in b) a schematic view is shown for the situation where the heat exchange medium flows along a Z in the frame structure, in c) a schematic view is shown for the situation where the heat exchange medium enters the frame structure from the same side as it leaves the frame structure, in d) a detailed top view of the frame structure is given.
Figure 1:
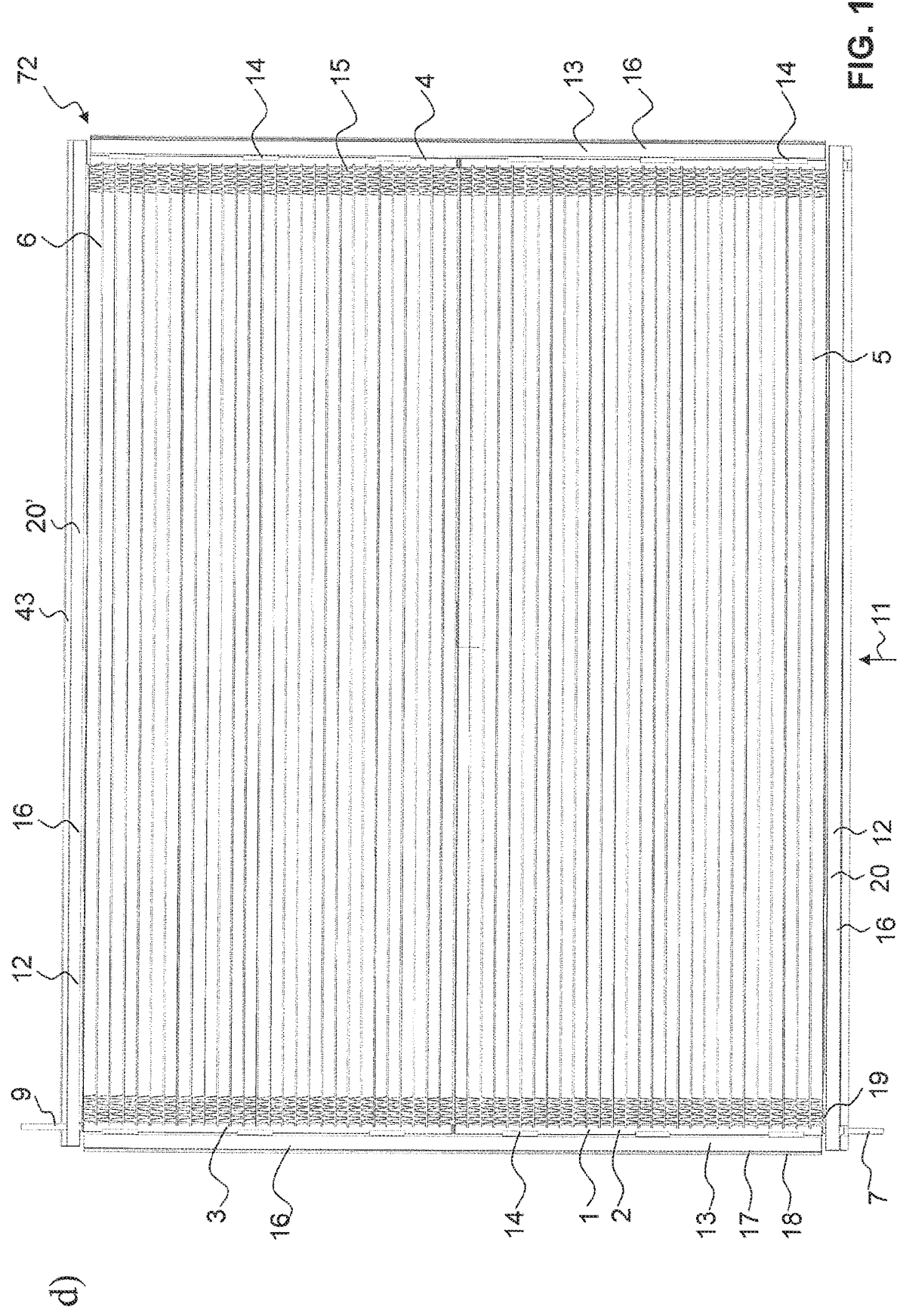

FIG. 1*a*) shows a layer element 72 in a schematic representation only displaying the heat exchange fluid transfer elements. In the embodiment according to FIG. 1*a*), there is provided, on each lateral side, a primary heat exchange piping. A first primary heat exchange piping 1 is provided on a first, in this case left side, and a second primary heat exchange piping 4 is provided on a second, in this case right side. In this particular embodiment, the left side heat exchange piping 1 is split into two sections, an upstream section 2 and a downstream section 3. Due to this splitting of the sections, heat exchange fluid 8 entering the section 2 via inlet 7, cannot flow through to the second section 3. By contrast, it will flow though the upstream section 2 and will then flow through a first half of the secondary heat exchange piping 5 extending between this first section 2 and the right side primary heat exchange pipe 4. This is indicated schematically by the arrows.

It will then be transported in the tube 4 downstream and will then be allowed, by means of the secondary heat exchange piping 6, to travel backwards again from the right side to the left side, and will then enter the downstream first side section 3 and only subsequently exit this left side primary heat exchange piping by means of the coupling element 9 for the heat exchange fluid outlet.

This structure, therefore, comprises two subsets of secondary heat exchange pipings in this whole secondary heat exchange array of pipes, an upstream section 5 and a downstream section 6, and normally the number of the upstream section pipes is essentially the same as the number of the downstream section pipes 6.

A different possibility is schematically illustrated in FIG. 1*b*). In this case, the upstream primary heat exchange piping on the left side is not split in two sections, and due to that, in all the secondary heat exchange pipes, the heat exchange fluid travels from the left to the right to the primary heat exchange piping on the right side.

Yet, another possibility of heat exchange fluid flow is illustrated in. FIG. 1*c*). In this case, the general set-up is essentially the same as in FIG. 1*b*), but here the heat exchange outlet 9 is located on the same side as the heat exchange inlet 7. In this array, again in all the secondary heat exchange pipes the heat exchange fluid travels from the left to the right, and turbulence losses, pressure gradients, and alike may not be optimal in this set-up, but it has the simplicity of having the inflow and the outflow of the heat exchange medium on the same side.

A more detailed representation of a layer is illustrated in FIG. 1*d*) in a top view. Here, one can see that a large number of secondary heat exchange pipes 5, 6 is provided, all equally spaced from each other. Also, one can see that between these pipes 5, 6 there are provided heat exchange metal sheets 15, which oscillate between adjacent i.e. neighboring secondary heat exchange pipes. These heat exchange metal sheets (lamella) are only illustrated in the edge portions in this figure, however, in reality they oscillate over the full transverse width of the length of the secondary heat exchange pipes.

Also in this representation one can see both transverse edges comprise transverse metal profiles 12. The upstream edge, relative to the gas inflow, is provided with a transverse female profile edge clement 20 and the downstream edge is provided with a transverse edge male profile 20'. The details of these transverse edge profiles will be given further below.

At the two lateral edges, again edge profiles 13 are provided as metal profiles 16. At the lateral outer side of the corresponding primary heat exchange piping 1-4 there is provided at each side a lateral edge profile 13. These profiles 13, like the profiles 20 and 20', are directly or indirectly attached to the heat exchange element by means of soldering and/or welding seams 14. The lateral profiles 13 are provided with longitudinal grooves 17 bordered by an outer ridge 18, the details of this structure will be given further below.

Not illustrated in the representations according to FIG. 1 are the adsorbent particulate material as well as the textile fabric layer confining the cavity in the respective frame element 72.

Figure 2:
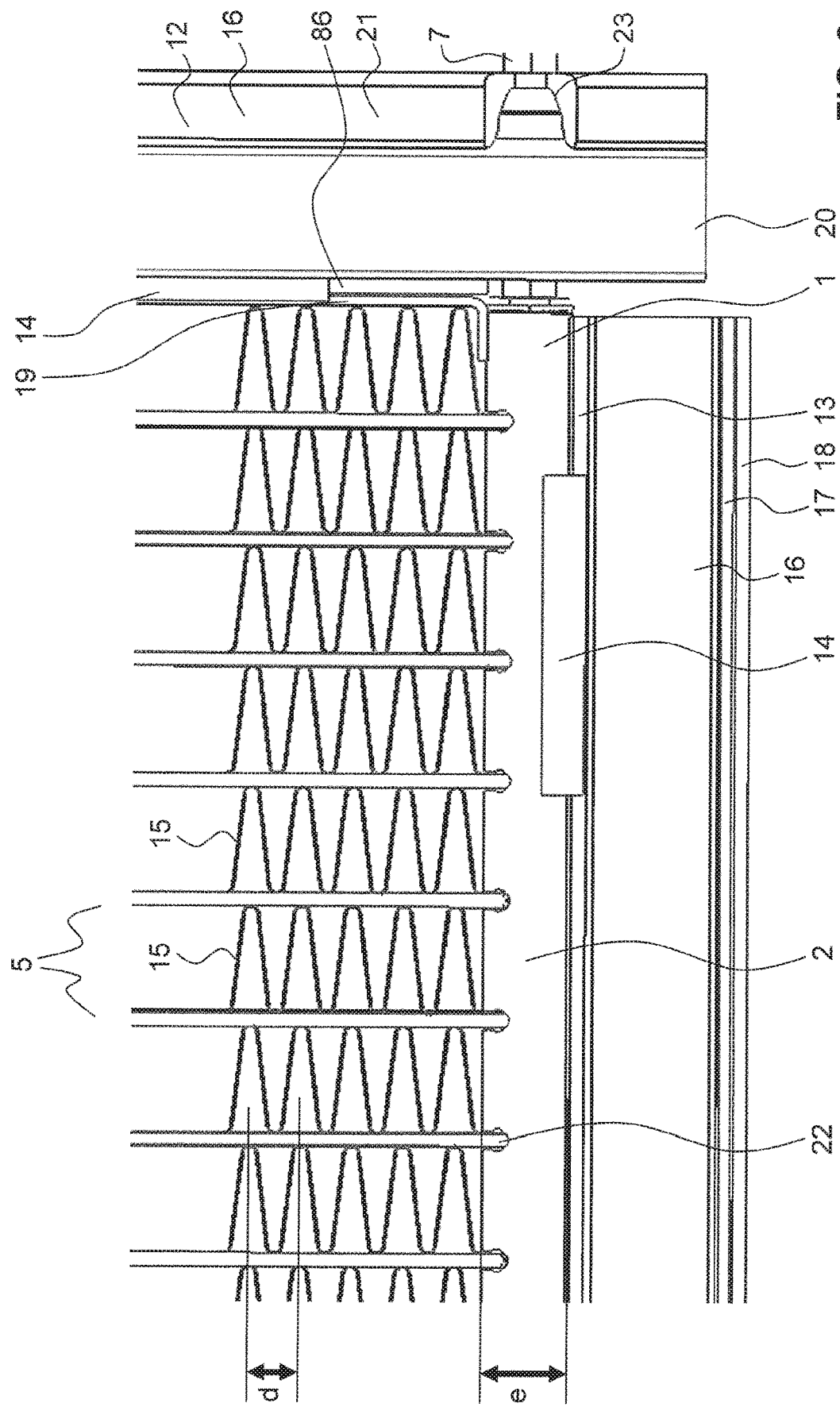
FIG. 2 shows a detailed representation of an edge portion of the frame structure at the heat exchange medium inlet edge.

In FIG. 2, a detailed top representation of the inlet section of such a frame structure, again without showing the particulate adsorbent material and the textile fabric layers, is given, Here, one can see how the secondary heat exchange piping extends perpendicularly to the upstream first side section 2, and that in this upstream first side section 2 there are provided equally spaced indentations 22, into which the terminal end portions of the respective secondary heat exchange pipe are inserted and attached thereto.

Further, the heat exchange metal sheet oscillates between two adjacent pipes 5 and is contacting, in the rounded portions, the respective side walls of the pipe 5. Like this, thermal contact is established between the sheets 15 and the tubes 5. Welding seam strips 14 attach the lateral edge profile 13 to the tubular primary heat exchange pipe 1. Furthermore, at the longitudinal ends of the frame structure there is provided a terminal transverse end profile 19 for structural reasons, and this is again is, by means of a welding seam, directly or indirectly attached to a transverse edge profile 12 along this edge. In this case, this transverse edge profile 12 comprises a core profile (86) which is wrapped around by a transverse female profile 20, which comprises a receiving section 21 having a cut out 23 for the coupling element for the heat exchange fluid inlet of the next adjacent layer in the stack.

Figure 3:
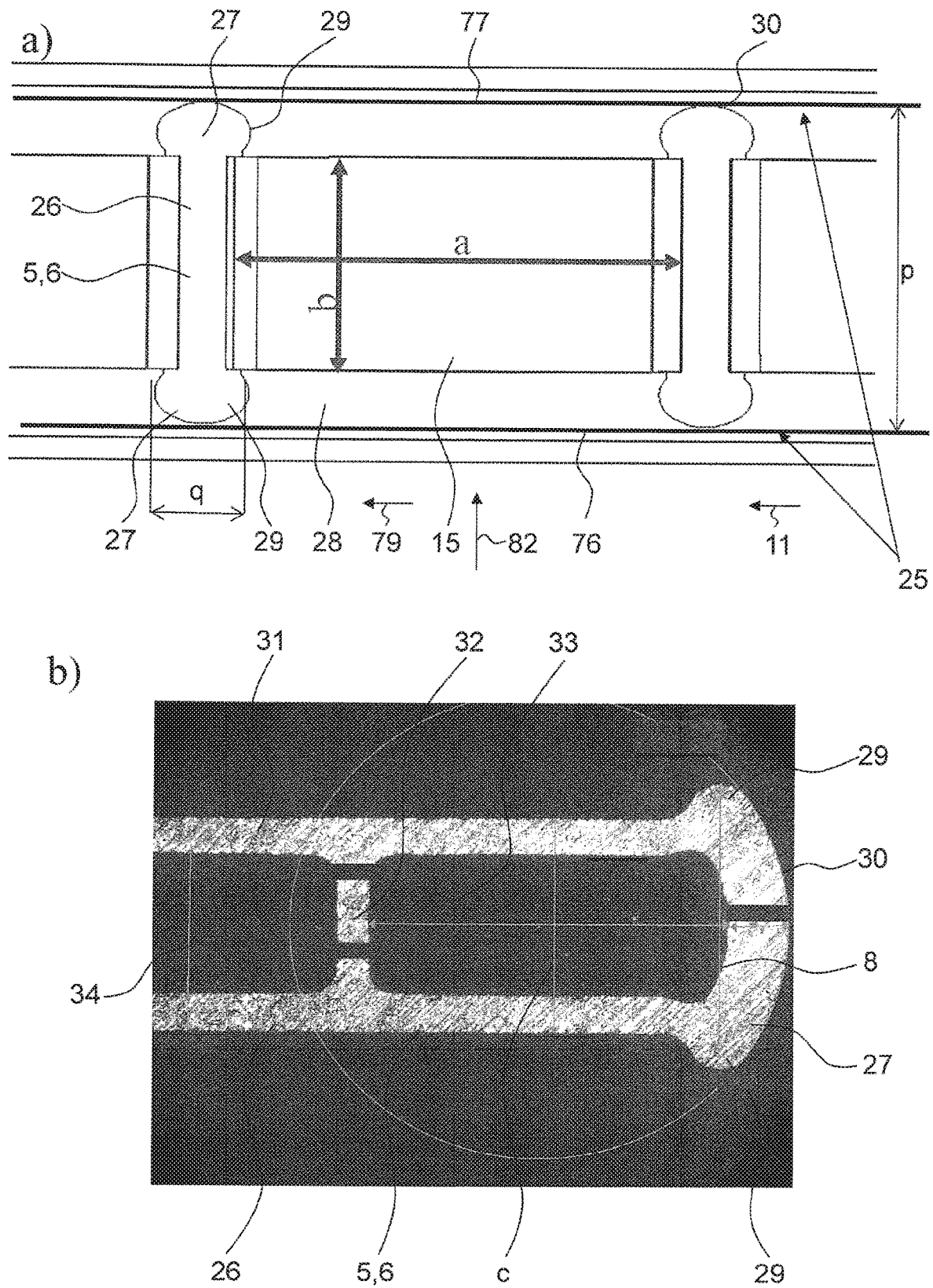
FIG. 3 shows in a) a cut in a direction perpendicular to the secondary heat exchange piping through a frame structure and in b) a detailed cut through half of a secondary heat exchange pipe showing the cross section.

In FIG. 3*a*), a cut view is shown illustrating the arrangement and the shape of the secondary heat exchange piping. As one can see, these pipes 5 comprise a narrow central portion 26 with essentially parallel flat sidewalls and at both ends two widened end portions 27. These widened end portions have a larger diameter in the longitudinal direction 79, and they, therefore, provide for two laterally bulging portions 29 at both sides. These bulging portions 29, therefore, define a distance, which, in this case, is the same as the height b of the metal sheet 15 between the two adjacent secondary heat exchange pipes. Due to this bulging portion 29, there is a clearly defined distance between the sheet of fabric material 25 and the edge of the metal sheet 15. The corresponding gap 28, therefore, provides for a safety gap preventing that, even in case of sagging, the sheet of fabric material contacts the edge of the metal sheet and can be damaged by the metal sheet 15.

Correspondingly, the rounded end portions 13 of the widened end portions 27 provide for a smooth and ideal contact for the sheet of fabric material 25 and the sheet of fabric material 25 may also be glued to this rounded end face 30 to make sure that no sorbent particulate material can travel between different gaps between pairs of pipes 5. In production this connection between the fabric material and the end faces 30 can be provided by depositing glue stripes on these end faces 30 and subsequently putting or rolling the fabric material on top of these faces 30.

In such a set-up, the distance between the two sheets of fabric material 25 enclosing the cavity is equal to the outer diameter p of the tubes 5, 6 and is typically in the range of 8-40 mm. The distance between adjacent pipes 5, 6 illustrated with a is typically in the range of 5-40 mm, normally around 17 mm, and the outer diameter q in the longitudinal direction is typically in the range of 2-4 mm normally around 2.4 mm.

In FIG. 3b) a detailed cut through a secondary heat exchange pipe is given, and here, one can see that a partition wall 32 is provided, actually along the full cross-section of the pipes. Two such partition walls are given, thereby partitioning the interior of the pipe into two lateral end flow through channels 33 and one central flow through channel 34.

The narrow central portion 26 is bordered by essentially straight lateral wails 31 allowing for ideal attachment of the metal sheet for optimized thermal transfer between the heat transfer fluid flowing in 33, 34 and the metal sheets and then to the sorbent particulate material, which is located in the interspace between the metal sheets.

Figure 4:
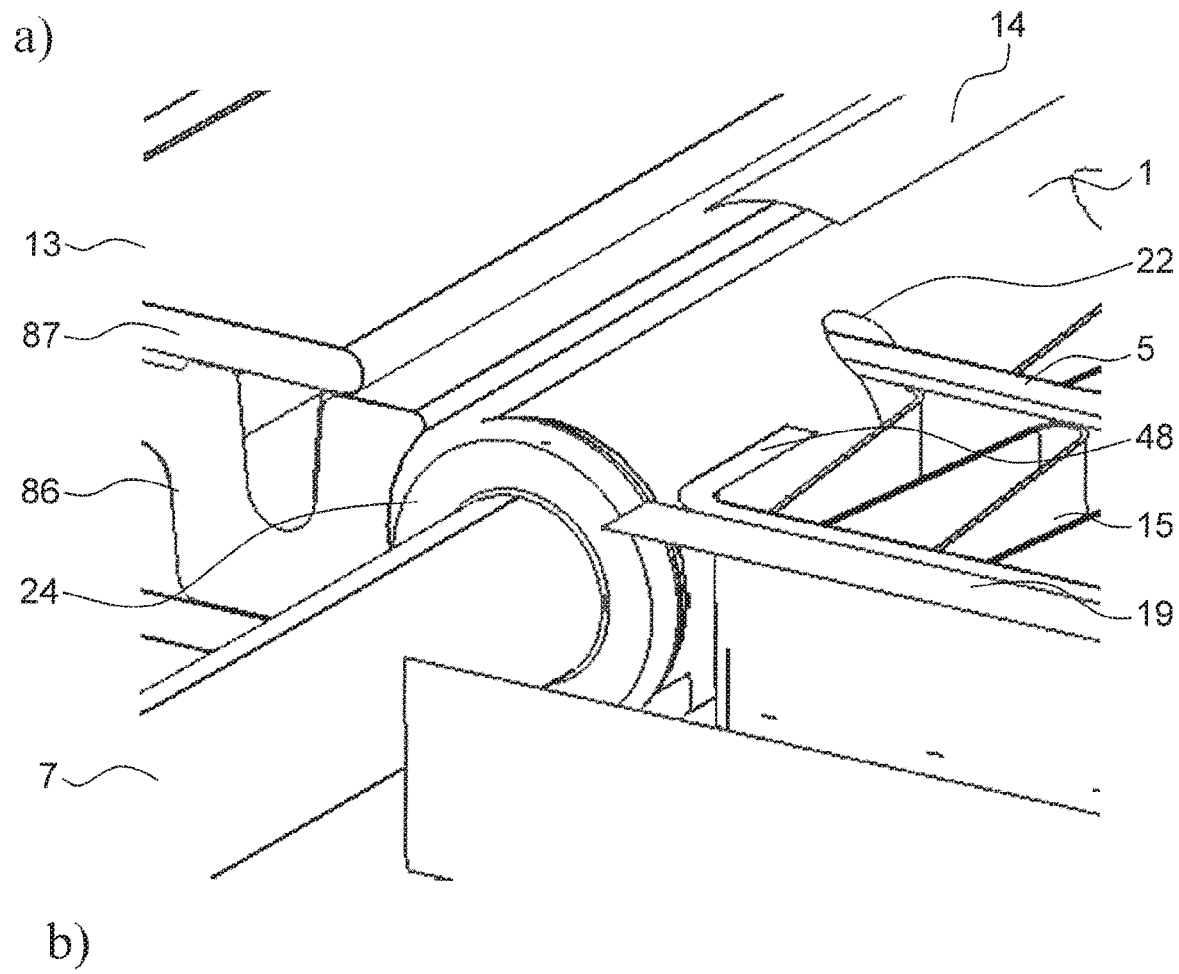
FIG. 4 shows in a) a perspective view of an edge portion of the frame structure at the heat exchange medium inlet edge; in b) view onto a primary heat exchange pipe before assembly of the heat exchange unit, and in c) a top view of an edge portion of the frame structure at the heat exchange medium inlet edge.
Figure 4:
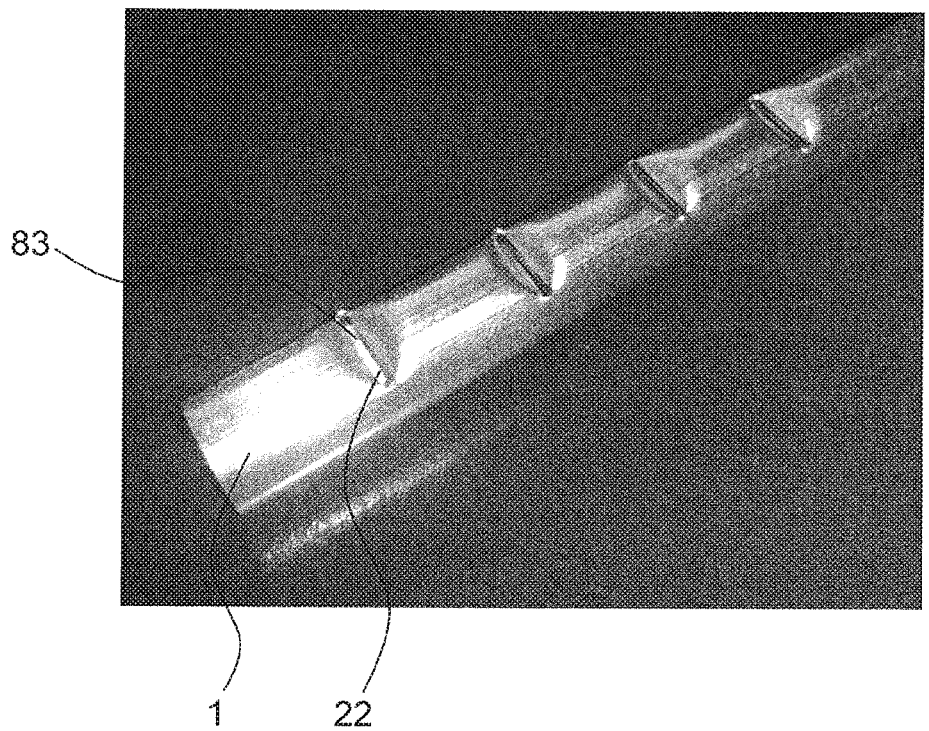
Figure 4:
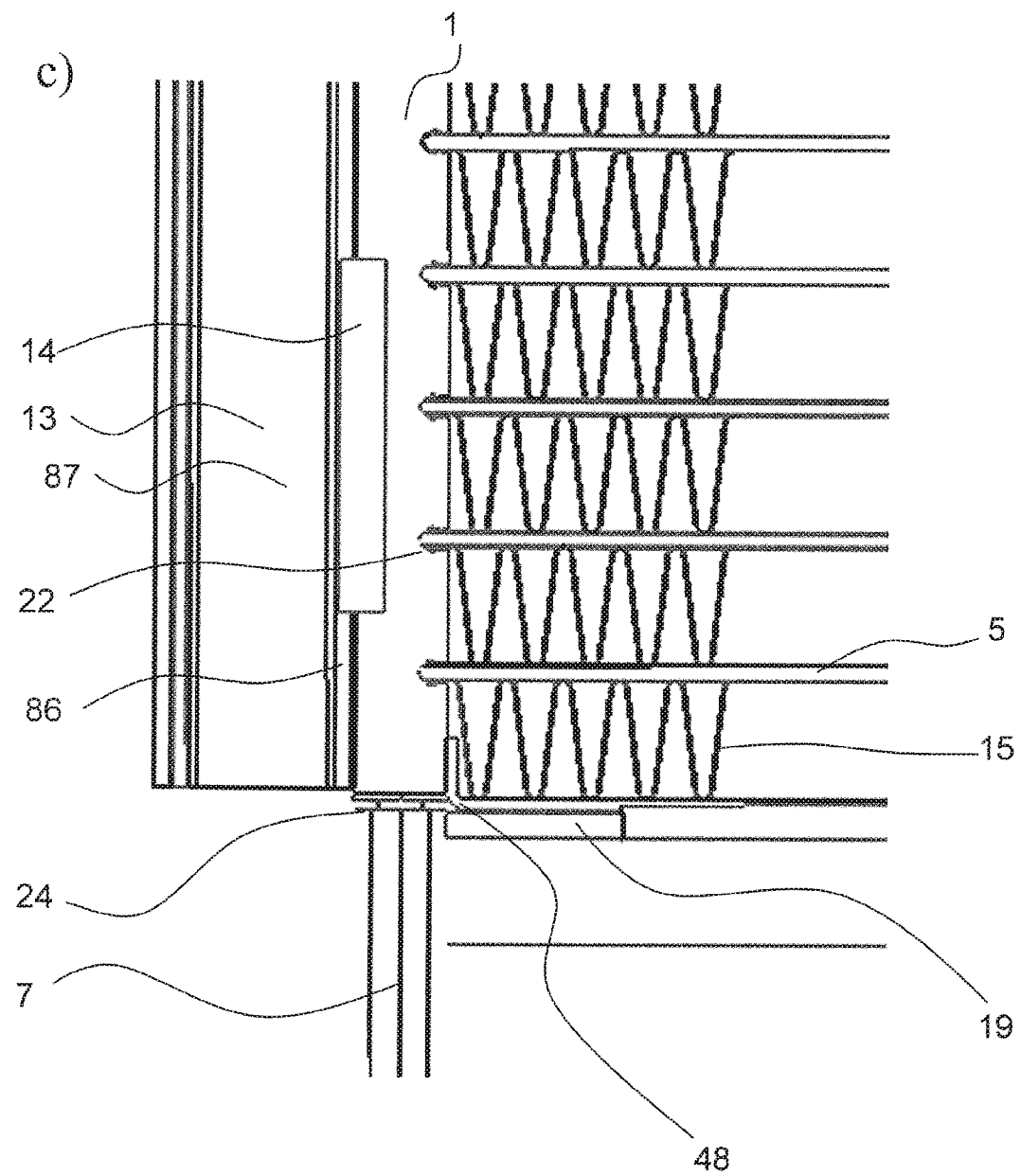

In FIG. 4a), a more detailed perspective view on to the inlet section of such a frame, again without textile fabric layers and without particulate sorbent, is illustrated. Here, the lateral edge is given by a core profile 86, which is welded (or soldered) by means of the welding seam 14 to the cylindrical tube 1. Furthermore, a lateral edge profile 87 wraps around this core profile 86 on the top and on the bottom side. Further, the primary heat exchange pipe 1 has a larger diameter of in this case typically about 13 mm, while the inlet pipe 7 has a slightly smaller diameter. To allow for a coupling between the two, there is provided a junction element 24. The transverse end profile 19 comprises a bent over longitudinal portion 48, which is welded (or soldered) to the terminal portion of the primary heat exchange pipe for improving stabilization.

In FIG. 4b), such a pipe 1 is illustrated focusing on the above-mentioned indentations 22. As a matter of fact, using simple tubular pipes it is possible to provide for such indentations with oblong holes 83, which have a height which is only insignificantly smaller than the outer diameter of the respective tube 1. It is possible to use 13 mm outer diameter tubes 1 and have such oblong holes 83 with a length of 10 mm, allowing for an as little as possible height of the full frame by optimum flow through cross-sections for the heat exchange medium.

Figure 5:
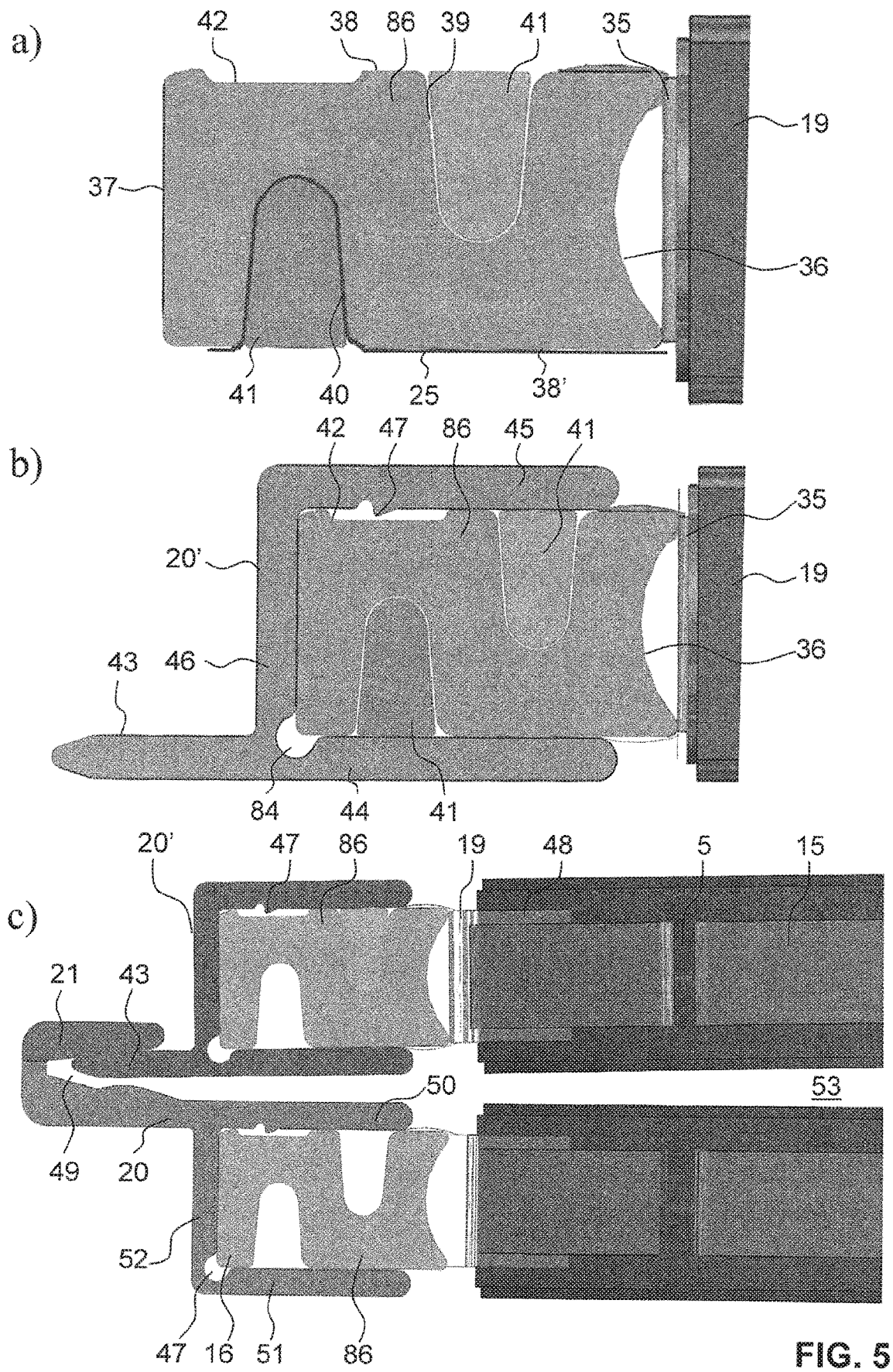
FIG. 5 shows a cut through the transverse edge portion of a frame structure in a), in b) with a possible female element to fix the fabric material layers, in c) a cut through the transverse edge portion of two adjacent frame structures with male (top) and female (bottom) element to fix the layers in sealing engagement.

In FIG. 5, different edge profile possibilities are illustrated. In FIG. 5a), the core profile 66 is given, this core profile can be used for surrounding the frame on all circumferential edges. This core profile 86 comprises a convex inner face 36 adapted to partially wrap around the tube 1 if attached on the lateral side. If attached to the transverse side, as illustrated in Fig. a), there is provided a welding seam attaching to the transverse end profile 19. The core profile 86 comprises two grooves 39, 40 running along the length of the core profile. These grooves are carried out from opposing sides and are offset with respect to each other, such that the core profile 86, viewed in cross section, is like an S-profile, and there is an inner groove 39 being closer to the cavity, and an outer groove 40, being more remote from the cavity. Like that the slimmest possible construction is made available. These grooves 39, 40 can be used for fixing the sheet of fabric material, in this embodiment by using clamping strips 41. The sheets 25 are put on top of the respective face 38, 38', and then the clamping strip is forced into the respective groove. Like this, not only is the textile fabric fixed on the core profile 86, but it is also put under tension, which is advantageous to avoid sagging of the textile sheet after filling.

As illustrated in FIG. 5b), the two clamping strips 41 are held in place by form closure in the corresponding groove (having as key function to clamp the sheet 25 of fabric material), and optionally further held in place by a transverse in this case male edge profile 20'. This profile 20' wraps around the core profile 86 by way of a first arm 44 and a second arm 45 joined by a bridging portion 46. The profile 20' is held in place by the interaction between a lock-in indentation 42 provided in one of the surfaces 38, 38' of the core profile 86, and a corresponding catching nose 47 provided on the inner side of one of the arms 45.

In order to allow for a force fit accommodation of the core profile 86 with the two clamping strips 41 in the interior of the profile 20' there is provided a groove 84 allowing for increased flexibility of the arms, in particular of arm 44. Also, the profile 20' comprises a projecting fin 43 acting as the male joining element as well be detailed further below.

In FIG. 5c), the arrangement of two adjacent stack layers is illustrated. In this case, the lower profile is provided with a female transverse profile 20, and the upper layer 72 is provided with a male profile 20', as discussed above in conjunction with FIG. 5b). The female profile 20 also comprises a first arm, 50 and a second arm 51 as well as a bridging portion 52 joining these two. Also here, a projection is provided making available a receiving groove 49 in the receiving section 21. The projecting fin 43 is shifted into the receiving groove 49 for providing a substantially gas-tight and mechanical connection between adjacent layers 72.

Figure 6:
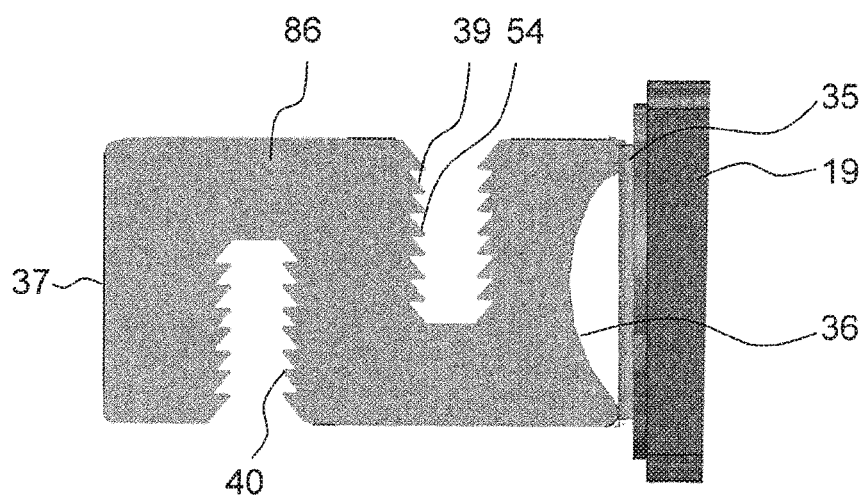
FIG. 6 shows cuts through alternative possibilities to fix the fabric material layers on the edge portions of the frame structure, wherein in a) an edge profile is shown, in b) an edge profile for the transverse edge with alternative male attachment means, in c) an edge profile for the transverse edge with alternative female attachment means, in d) an edge profile for the longitudinal edge, in e) an alternative edge profile for the longitudinal edge, in f) a top view onto the frame structure at the heat exchange medium inlet edge with an alternative edge structure, in g) a top view onto the frame structure at the heat exchange medium inlet edge with yet an alternative edge structure, in h) all alternative edge profile and in i) a fixing slat is shown.
Figure 6:
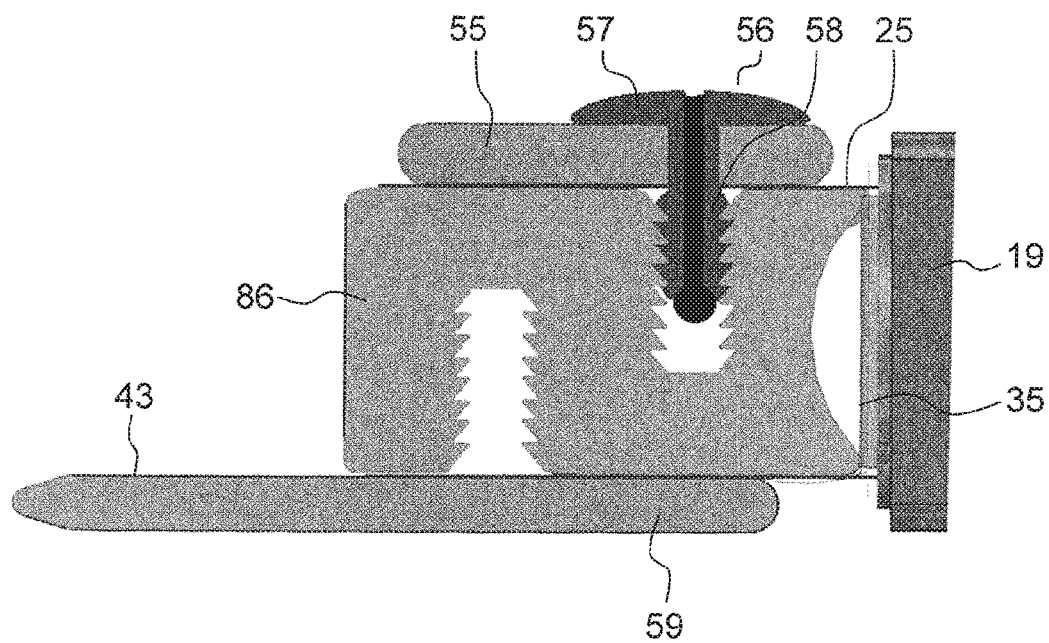
Figure 6:
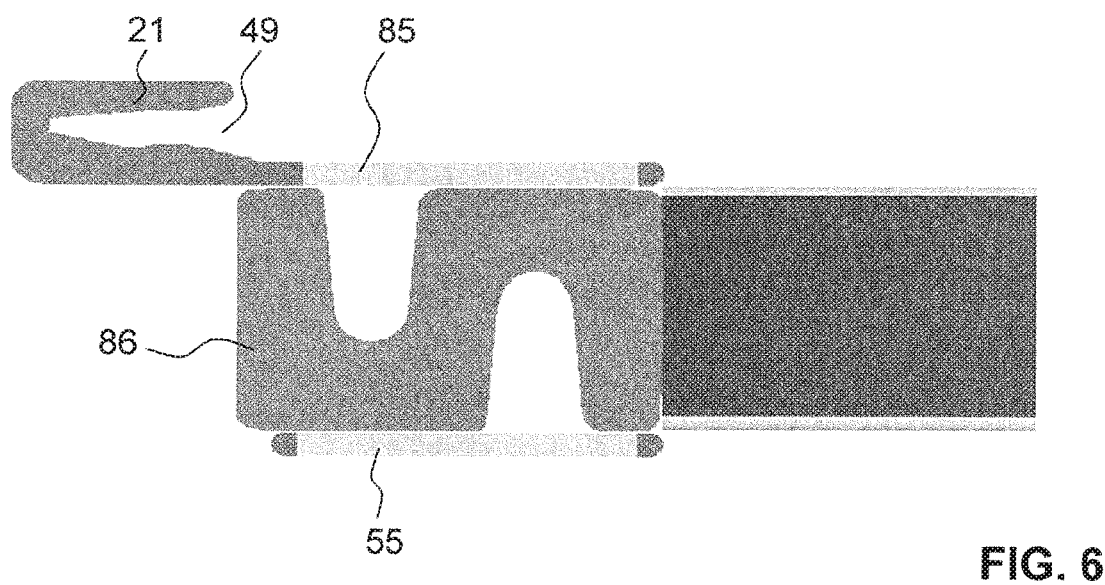
Figure 6:
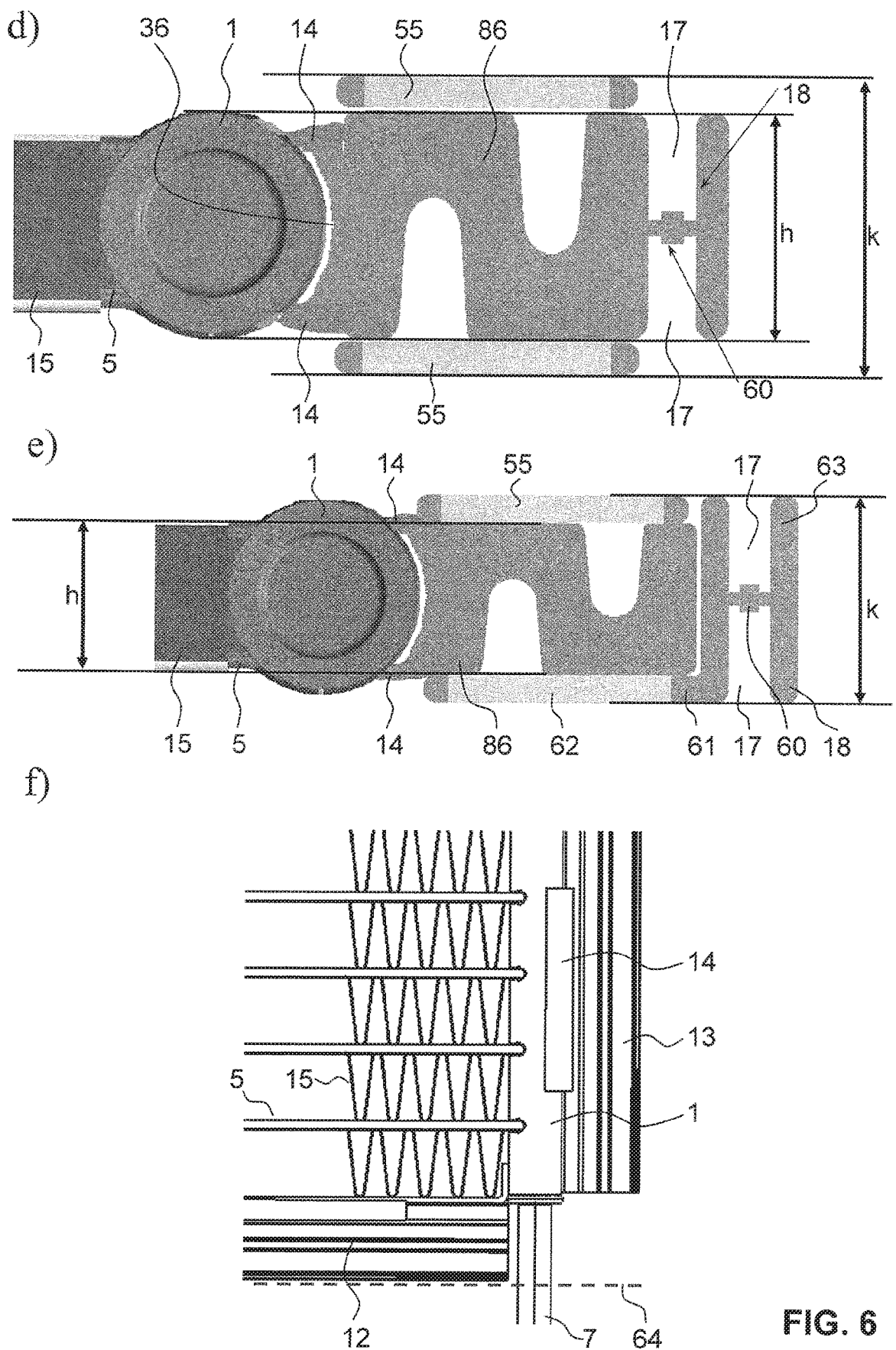
Figure 6:
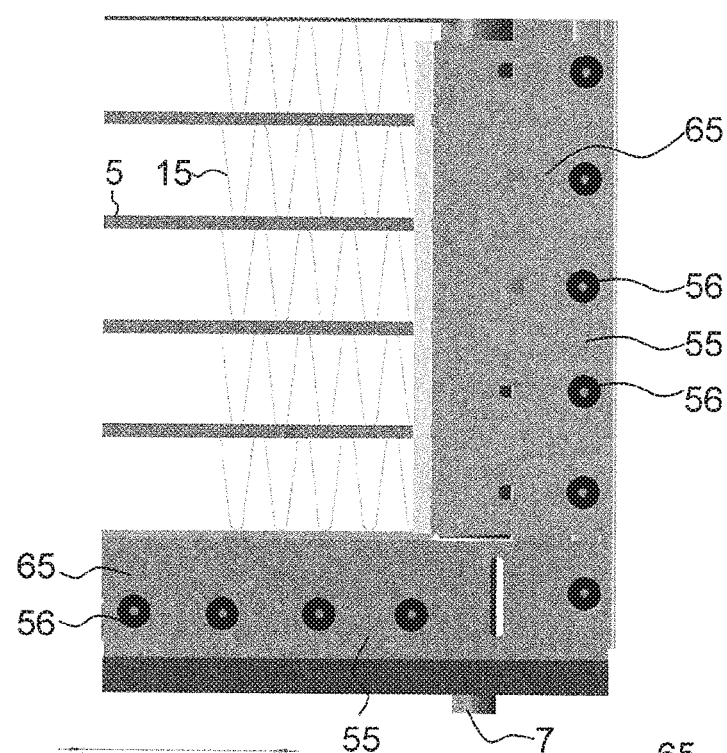
Figure 6:
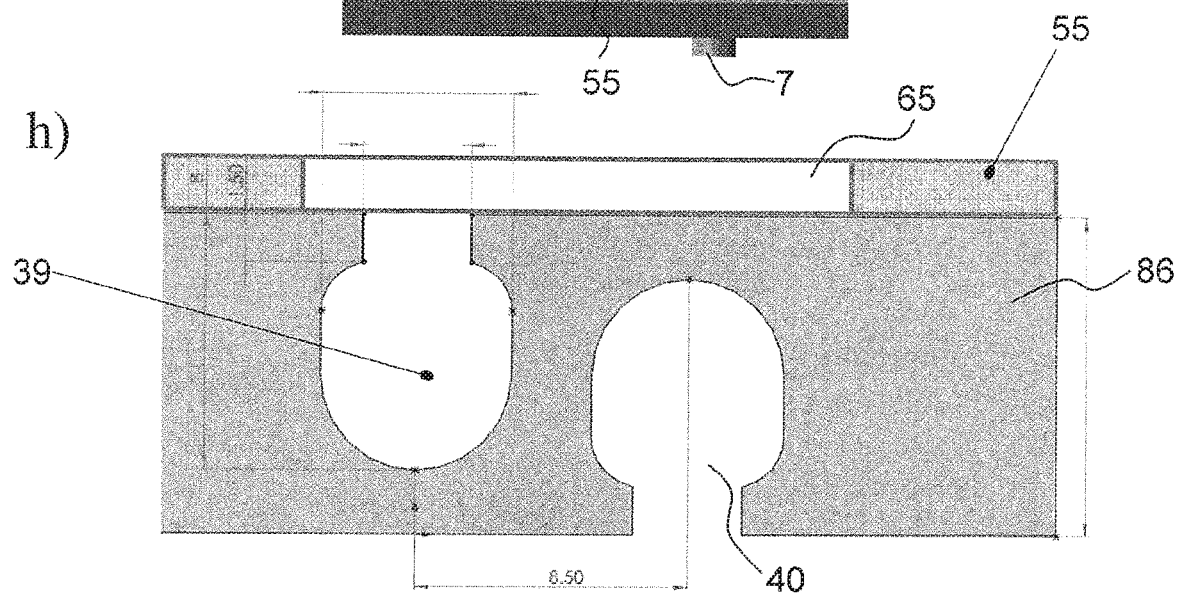
Figure 6:
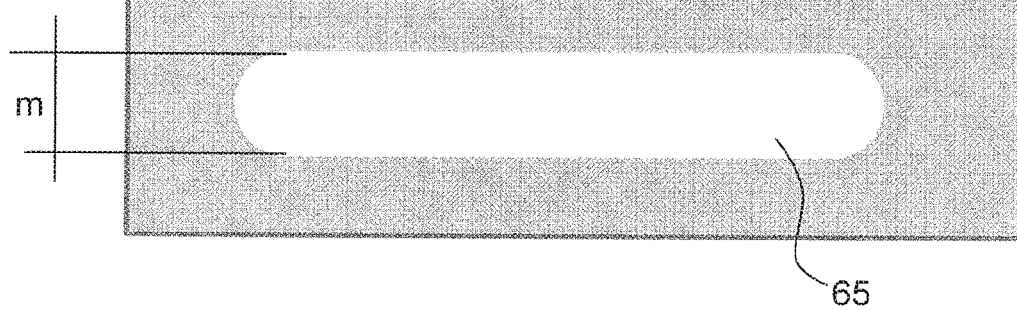

In FIG. 6, alternatives to these profiles 20 and 20' as well as 86 are illustrated. As illustrated in FIG. 6a), it is possible to have in the grooves 39, 40 toothings allowing for simpler attachment of, as illustrated in FIG. 6, e.g. rivets 56. In this case, there is no wrap around profile element, but in this case, the male edge profile is provided by a wide male slat 59 having a projection 43 and a fixing slat 55 on the other side of the core profile 86. Both these slats are used for fixing the textile layer 25 to the respective core profile 86, this is done by a series of rivets 56 distributed along the length of the edge. The rivets 56 comprise a rivet head 57 as well as a rivet pin 58, the rivet pin being inserted into the respective groove 39 or 40.

The correspondingly simplified female edge construction for the transverse edge is shown in FIG. 6c), here, one side is provided by a fixing slat 55, and the other side is provided by a slat 85, again having a receiving section 21 providing for receiving groove 49 for insertion of the projecting fin 43 of the next adjacent layer. The slats 55 and 85 are again attached to the core profile 86 by means of rivets 56, which are, however, not illustrated in FIG. 6c).

In FIG. 6d) a possibility for providing the lateral edge profile is illustrated. In this case, the core profile 86 is provided with an extension portion comprising a two-sided ridge 18 enclosing two opposing grooves 17. On the bottom of the respective groove 17 undercuts 60 are provided. These grooves 17 take up the stake plates 66 as will be detailed further below.

The textile layers 25 are fixed by means of the slats 55, which are attached to the edge profiles by means of rivets (56) (not shown in this figure). The primary heat exchange pipe is a tubular pipe, which is attached by means of welding seams and is snuggly fitting into the convex inner face 36.

An alternative possibility for the transverse profile is shown in FIG. 6e). In this case, there is a conventional core profile 86, but the lower fixing slat is replaced by an attachment section 62 of an alternative one-sided lateral profile 61. This lateral profile comprises a stacking section 63 defining two opposing grooves again to be used for shifting the stack plates 66 as will be detailed further below.

In these constructions, the height h is typically in the range of 13 mm and the height k in case of the construction of FIG. 6d) is around 17 mm, and in case of the construction according to FIG. 6e) is 14 mm. The height h in FIG. 6e) is around 10 mm.

In FIG. 6f), a more detailed representation of an edge portion of such a frame is shown, Here, one can see that the lateral edge profile can be extended so as to be flush with the outer edge of the lateral profile 12 to allow for better attachment of the textile layer.

Another possibility using the above-mentioned slats 55 is given in the representation according to FIG. 6g), here, the slats 55 are provided with oblong holes 65 to allow for adjustments of the position of the respective slats.

In FIG. 6h), a different cross-sectional profile for the edge profile is shown, in this case, the grooves 39, 40 are shaped differently, and here, one can see that the oblong holes 65 provide for versatile use of the same slats 55 irrespective of which groove 39 or 40 is used.

In FIG. 6i), a detail of such a slat 55 is shown indicating the oblong holes 65, having typically a width in the range of 3.4 mm.

Figure 7:
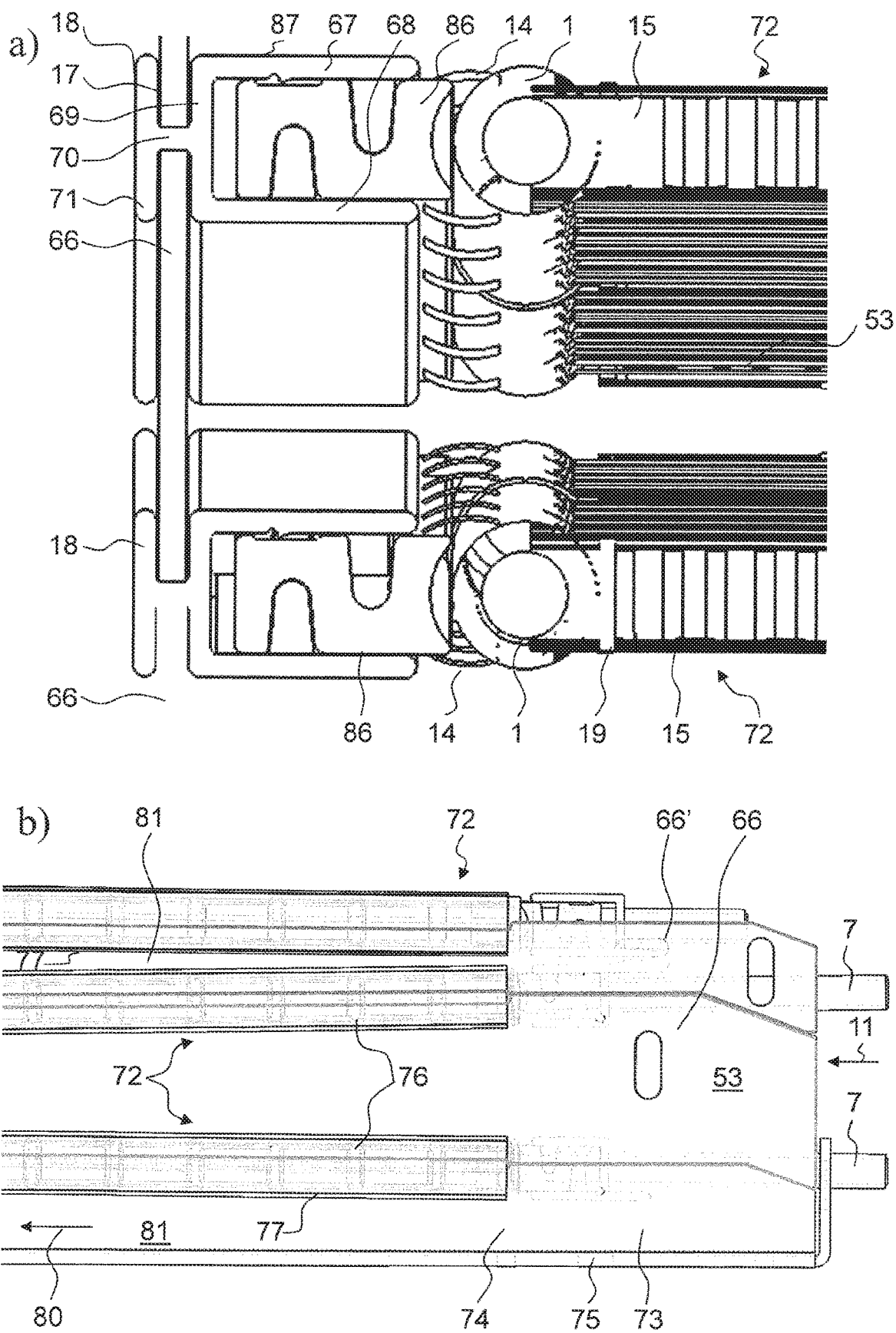
FIG. 7 shows a view into the interspace between two mounted adjacent frame structures in a stack in a) and in b) a lateral view onto such a stack.

In FIG. 7, a view into the interspace 53 between adjacent frames is shown. Here, another embodiment of the lateral edge profile 13 in this case again by way of profile 87 wrapping around the core profile 86 by means of a first and second arm 67, 68 and having a bridging section 69 is shown. This bridging section is, by way of a joining web 70, attached to an end web 71 providing for a groove 17 to the upper end to the lower side.

As one can see in this Fig., these grooves 17 are used to take up stack plates 66. As illustrated in FIG. 7b), a stack is built in that a bottom metal sheets 73 having a horizontal bottom portion 75 and two lateral vertical portions 74 is provided, and on to this bottom metal sheet a first layer 72 is put in that the corresponding groove 17 takes up the edge portion of the vertical portion 74. Then, the next stack plate 66 is shifted onto the next groove 17 being open to the upper side of this first layer 72, on both sides, and then layer 72 is put onto that stack plate 66 on the upper edge thereafter by using the corresponding groove 17 facing downwards. Like this, a very versatile stacking option is given, and also by simply choosing different shapes of stack plates, the relative orientation of the layer can be varied along the stack.

Figure 8:
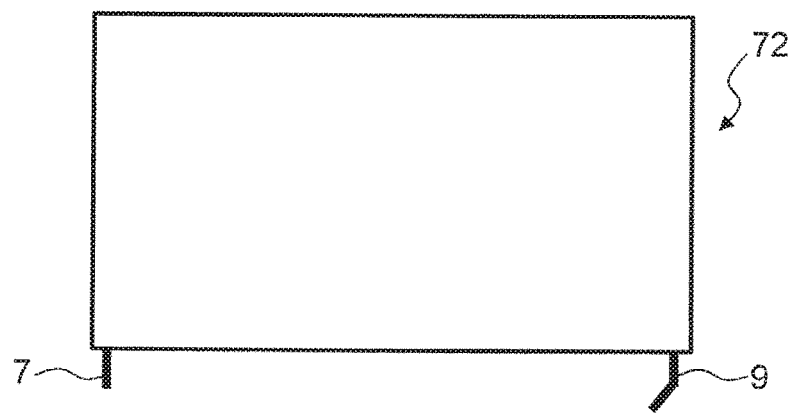
FIG. 8 in a) shows a top view onto a frame structure with adapted heat transfer fluid feeding tubing and in b) shows a possible connecting joint embodiment of an adapted heat transfer fluid feeding.
Figure 8:
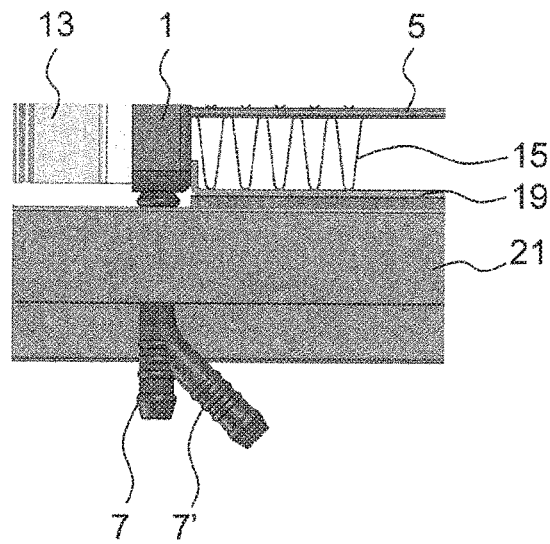

Since the corresponding new constructions are very slim and very densely packed, there may be spatial problems with respect to the inlets and outlets for the heat exchange fluid. As illustrated in FIG. 8, to avoid these problems it is possible to have, alternatingly in adjacent layers, either straight outlets as given in FIG. 8a) on the left side or, in the next layer as illustrated in FIG. 8b) a bent adapter 7' to avoid collision.

LIST OF REFERENCE SIGNS

| | |
|---|---|
| 1 | primary heat exchange piping on first side |
| 2 | upstream first side section of 1 |
| 3 | downstream first side section of 1 |
| 4 | primary heat exchange piping on second side |
| 5 | secondary heat exchange piping from $1^{st}$ to $2^{nd}$ side |
| 6 | secondary heat exchange piping from $2^{nd}$ to $1^{st}$ side |
| 7 | coupling element for heat exchange fluid inlet |
| 8 | inflow of heat exchange fluid |
| 9 | coupling element for heat exchange fluid outlet |
| 10 | outflow of heat exchange fluid |
| 11 | gas inflow |
| 12 | transverse edge profile |
| 13 | lateral edge profile |
| 14 | welding seam |
| 15 | heat exchange metal sheet, heat exchange lamella |
| 16 | edge profile |
| 17 | groove in 13 |
| 18 | ridge of 13 |
| 19 | transverse end profile |
| 20 | transverse female profile |
| 20' | transverse male profile |
| 21 | receiving section of 20 |
| 22 | indentation in 1 for 5 |
| 23 | cut out in 21 for heat exchange fluid inlet of subsequent frame in stack |
| 24 | junction element between 7 and 1 |
| 25 | sheet of fabric material |
| 26 | narrow central portion of 5, 6 |
| 27 | widened end portion of 5, 6 |
| 28 | gap between edges of 15 and 25 |
| 29 | laterally bulging portion of 27 |
| 30 | rounded end face of 27 |
| 31 | lateral wall |
| 32 | partition wall |
| 33 | end flow through channel |
| 34 | central flow through channel |
| 35 | welding seam |
| 36 | convex inner face of 86 |
| 37 | outer face of 86 |
| 38 | top face of 86 |
| 38' | bottom face of 86 |
| 39 | inner groove in 86 |
| 40 | outer groove in 86 |
| 41 | clamping strip |
| 42 | lock-in indentation of 86 |
| 43 | projecting fin of 20' |
| 44 | first arm of 20' |
| 45 | second arm of 20' |
| 46 | bridging portion of 20' |
| 47 | catching nose on inner side of 45 |
| 48 | longitudinal portion of 19 |
| 49 | receiving groove of 20 |
| 50 | first arm of 20 |
| 51 | second arm of 20 |
| 52 | bridging portion of 20 |
| 53 | interspace between adjacent frames, gas inlet channel |
| 54 | toothing in 39/40 |
| 55 | fixing slat |
| 56 | rivet |
| 57 | rivet head |
| 58 | rivet pin |
| 59 | wide male slat |
| 60 | undercut of bottom of 17 |
| 61 | alternative one-sided lateral profile |
| 62 | attachment section of 61 |
| 63 | stacking section of 61 |
| 64 | lateral edge of 13 |
| 65 | oblong hole in 55 |

-continued

LIST OF REFERENCE SIGNS

| | |
|---|---|
| 66 | stack plate |
| 67 | first arm of 13 |
| 68 | second arm of 13 |
| 69 | bridging section of 13 |
| 70 | joining web of 13 |
| 71 | end web of 13 |
| 72 | particulate sorbent material layer element |
| 73 | bottom metal sheet |
| 74 | vertical portion of 73 |
| 75 | horizontal portion of 73 |
| 76 | inlet face of 72 |
| 77 | outlet face of 72 |
| 78 | transverse direction |
| 79 | longitudinal direction |
| 80 | gas outflow |
| 81 | gas outlet channel |
| 82 | direction perpendicular to the frame plane |
| 83 | oblong hole in 1 in the region of 22 for attaching 5 |
| 84 | groove |
| 85 | slat |
| 86 | core profile |
| 87 | lateral profile element |
| a | distance between adjacent secondary heat exchange pipes |
| b | height of 15 |
| c | width of 26 |
| d | periodicity of 15 |
| e | outer diameter of 1 |
| f | thickness of d |
| g | width of 27 |
| h | height of 86 |
| k | right of final outer frame |
| m | width of 65 |
| p | outer diameter of 15 in a direction perpendicular to the plane of the frame element |
| q | outer diameter of 15 in longitudinal direction |

The invention claimed is:

1. A gas separation unit for the separation of a first gas from a mixture containing said first gas as well as further gases different from the first gas, by using a cyclic adsorption/desorption process using a loose particulate sorbent material for gas adsorption,
wherein said particulate sorbent material is arranged in at least two stacked layers,
wherein each layer comprises two sheets of a flexible fabric material:
which flexible fabric material is gas permeable but impermeable to the loose particulate sorbent material,
which sheets are arranged essentially parallel defining an inlet face of the layer and an outlet face of the layer,
which sheets are arranged with a distance between the sheets in the range of 0.3-11 cm or 0.3-5 cm, and
which sheets are mounted on a rectangular circumferential frame structure,
said rectangular frame structure including four metal profiles arranged pairwise mutually parallel, one pair along a longitudinal direction and one pair along a transverse direction, with respect to the airflow through the gas separation unit, and said frame structure enclosing, together with said sheets of flexible fabric material a cavity in which the particulate sorbent material is located,
wherein primary heat exchange piping, as part of the metal profiles or as separate elements, is arranged on the two lateral outer edges of each layer, extending along said longitudinal direction, said primary heat exchange piping comprising:
at least one first lateral outer edge heat exchange piping at a first lateral side of the rectangular frame structure with at least one heat exchange fluid inlet and at least two or a plurality of heat exchange fluid outlets,
and at least one second lateral outer edge heat exchange piping at a second lateral side of the rectangular frame structure comprising at least two or a plurality of heat exchange fluid inlets and at least one heat exchange fluid outlet,
wherein at least one essentially parallel array of secondary heat exchange pipes is provided within the cavity, each secondary heat exchange pipe fluidly connecting a first lateral outer edge heat exchange piping with a second lateral outer edge heat exchange piping, said secondary heat exchange pipes extending along said transverse direction and being spaced at a distance, along said longitudinal direction, in the range of 0.5-5 cm;
wherein the first outer diameter of the secondary heat exchange pipes in a direction perpendicular to the plane of the layer is at least twice as large as the second outer diameter of the secondary heat exchange pipes in the longitudinal direction, and
wherein either said secondary heat exchange pipes are in thermal contact with sheets of metal which are arranged essentially perpendicular to the main plane of the frame, and which extend oscillating between pairwise adjacent secondary heat exchange pipes either over the complete transverse distance or at least partially and/or section-wise between the first side and secondary side primary heat exchange piping and thereby contacting the secondary heat exchange pipes for thermal contact at a plurality of contact points, or said secondary heat exchange pipes are held in place with spacers which are arranged essentially perpendicular to the main plane of the frame, and which at least extend between pairwise adjacent secondary heat exchange pipes,
wherein the unit has a gas inlet side or gas inlet manifold through which an inflow of gas mixture enters the unit and a gas outlet side or gas outlet manifold through which a gas outflow exits the unit, the gas pathway between the inflow and the outflow being confined in the unit to pass through at least one layer,
wherein said layers are arranged in the unit such that the inflow passes through the inlet face, subsequently through the particulate sorbent material located in the cavity of the respective layer, subsequently to exit the respective layer through the outlet face to form the gas outflow,
wherein the layers are arranged such that inlet faces of adjacent layers are facing each other enclosing gas inlet channels and such that outlet faces are facing each other enclosing gas outlet channels, and
wherein the mean distance between inlet faces and/or outlet faces defining said channels, measured in a direction essentially perpendicular to a main gas inflow direction and a main gas outflow direction, respectively, is in the range of 0.5-25 cm.

2. The gas separation unit according to claim 1,
wherein the first outer diameter of the secondary heat exchange pipes is in the range of 5-30 mm, or
wherein the second outer diameter of the secondary heat exchange pipes, at the widest position, is in the range of 1.5-5 mm, or
wherein the first outer diameter of the secondary heat exchange pipes is a factor of 3-20 larger than the second outer diameter of the secondary heat exchange pipes in the longitudinal direction.

3. The gas separation unit according to claim 1,
wherein the secondary heat exchange pipes have an oval or essentially rectangular inner and/or outer cross section with the longer axis of the cross section extending perpendicular to the plane of the respective frame, or
wherein the secondary heat exchange pipes comprise a constricted area in the longitudinal direction, or
wherein the height of the sheets of metal or of the spacers, is smaller than the first outer diameter, or
wherein the sheets of metal are flat, corrugated, finned and/or or perforated, or
wherein the secondary heat exchange pipes comprise a narrow central portion with a diameter in the range of 0.5-3 mm, and at both ends a widened portion with bulging portions extending beyond the surface of the narrow central portion and providing an end surface, and wherein the height of the sheets of metal, is essentially the same or smaller than length of the narrow central portion in a direction perpendicular to the plane of the layer, or
wherein the secondary heat exchange pipes comprise at least one partition wall running essentially in the plane of the layer in the hollow interior of the secondary heat exchange pipe.

4. The gas separation unit according to claim 1,
wherein the sheets of metal have a height, measured in a direction perpendicular to the plane of the respective layer, in the range of 5-15 mm, or
wherein the sheets of metal have a thickness in the range of 0.1-1 mm,
wherein the sheets of metal oscillate between adjacent secondary heat exchange pipes and are soldered and/or welded to the second outer diameter wall in rounded or angular portions of the sheets of metal, wherein said rounded or angular portions are joined by straight portions of the sheets of metal bridging the interspace between adjacent secondary heat exchange pipes, or
wherein one single sheet of metal is provided between a pair of adjacent secondary heat exchange pipes extending, in an oscillating manner, from the first lateral edge region of a frame to the second lateral edge region of the frame.

5. The gas separation unit according to claim 1,
wherein the primary heat exchange pipes are provided as tubes of essentially circular hollow cylindrical shape, having an outer diameter in the range of 5-40 mm.

6. The gas separation unit according to claim 1,
wherein said metal profiles include a core profile, which comprises in cross section at least one groove in at least one of the top face and bottom face, and
wherein said at least one groove is are used for directly or indirectly fixing the flexible fabric material layer to the frame construction.

7. The gas separation unit according to claim 6, wherein profile elements are provided as parts of a metal profile which profile elements wrap around said core profile and which comprise first and second arms contacting the top and bottom faces of the core profile.

8. The gas separation unit according to claim 1, wherein pairs of adjacent frame structures are provided, at the facing transverse edges contacting in use with in one case a tongue protrusion extending over the full width of the edge, and a corresponding counter profile providing a slot also extending over the full width of the edge, such that by inserting said tongue of one frame into said slot of the adjacent frame the adjacent frame elements are mechanically fixed as well as sealed relative to each other.

9. The gas separation unit according to claim 1, wherein the longitudinal metal profiles are provided with elements for stacking layers.

10. The gas separation unit according to claim 1,
wherein it comprises, on a first lateral side, an upstream first side section of the primary heat exchange piping extending essentially over half of the longitudinal length of the respective frame, and a downstream first side section extending over the remaining longitudinal length of the respective frame, and on a second lateral side one single primary heat exchange piping, and
wherein a first array of secondary heat exchange pipes fluidly connects the heat exchange path in a transverse direction between the first side section of the primary heat exchange piping with an upstream portion of the single primary heat exchange piping on the second lateral side, and a second array of secondary heat exchange pipes fluidly connects the heat exchange path in a transverse direction between the single primary heat exchange piping on the second lateral side with the downstream first side section on the first lateral side, and
wherein heat exchange fluid inlet is provided on said upstream first side section and a heat exchange fluid outlet is provided on said downstream first side section.

11. The gas separation unit according to claim 1,
wherein it comprises, in one layer in the range of 25-70 secondary heat exchange pipes running parallel and in one plane.

12. The gas separation unit according to claim 1,
wherein the flexible fabric material is woven or nonwoven textile material, or the flexible fabric material is made from a cellulose based material, or
wherein the flexible fabric material has a thickness in the range of 0.1-4 mm, or
wherein the flexible fabric material, has a gas permeability in the range of 2500-5000 l/m2/s, or
wherein at least the upstream layer of the flexible fabric material is chosen as a filter fabric material of at least M6 or at least F6 or at least F7 class according to DIN EN 779 or wherein additional to the upstream layer of the flexible fabric material there is provided filter fabric material of at least M6 or at least F6 or at least F7 class.

13. The gas separation unit according to claim 1,
wherein along the stack of layers the distance between adjacent layers is varied taking account of the pressure drop profile of the inflow, or
wherein along the stack of layers the angle of the layers to a main horizontal or vertical axis of the unit in case of a central inflow is gradually increasing from a value of around zero at the center to a value in the range of 0-20°.

14. A method for producing a layer for a gas separation unit according to claim 1,
wherein in a first step the primary heat exchange piping, the secondary heat exchange piping, the heat exchange metal sheets, and/or the spacers extending between pairwise adjacent secondary heat exchange pipes, if needed supplemented by further structural elements, are assembled and soldered and/or welded together, to form an assembled structure, and
wherein in a second step circumferential metal profiles are attached to said assembled structure, if not already attached in step 1,
wherein in a third step the bottom fabric layer is attached to the bottom surface, wherein in a fourth step the loose particulate sorbent material is introduced into the cavity, and wherein in a fifth step the top fabric layer is attached to the top surface, with the proviso that the fourth step can alternatively or as an additional step be carried out after the fifth step.

15. A method of using a unit according to claim 1 for extracting at least carbon dioxide from air and/or flue gases and/or biogas and/or other $CO_2$-containing gas streams.

16. A gas separation unit according to claim 1, wherein said unit is for the separation of carbon dioxide from a mixture containing carbon dioxide as well as further gases different from carbon dioxide.

17. The gas separation unit according to claim 1, wherein the sheets are arranged with a distance between the sheets in the range of 0.3-5 cm.

18. The gas separation unit according to claim 1, wherein primary heat exchange piping, as part of the metal profiles or as separate elements, is arranged on the two lateral outer edges of the layer, within the cavity, extending along said longitudinal direction.

19. The gas separation unit according to claim 1, wherein the mean distance between inlet faces and/or outlet faces defining said channels, measured in a direction essentially perpendicular to a main gas inflow direction and a main gas outflow direction, respectively, is in the range of 0.5-15 cm.

20. The gas separation unit according to claim 1, wherein the first outer diameter of the secondary heat exchange pipes is in the range of 5-20 mm, or wherein the second outer diameter of the secondary heat exchange pipes, at the widest position, is in the range of 1.8-3 mm, or wherein the first outer diameter of the secondary heat exchange pipes is a factor of 3-10 larger than the second outer diameter of the secondary heat exchange pipes in the longitudinal direction.

21. The gas separation unit according to claim 1, wherein the first outer diameter of the secondary heat exchange pipes is in the range of 8-12 mm, or wherein the second outer diameter of the secondary heat exchange pipes, at the widest position, is in the range of 2-2.5 mm, or wherein the first outer diameter of the secondary heat exchange pipes is a factor of 3.5-5 larger than the second outer diameter of the secondary heat exchange pipes in the longitudinal direction.

22. The gas separation unit according to claim 1, wherein the secondary heat exchange pipes have an oval or essentially rectangular inner and/or outer cross section with the longer axis of the cross section extending perpendicular to the plane of the respective frame, wherein in case of a rectangular cross section the outer diameter is provided with rounded edges, or wherein the secondary heat exchange pipes comprise a constricted area in the longitudinal direction, wherein the cross section of the secondary heat exchange pipes comprise a narrow central portion with a diameter in the range of 0.5-3 mm, and at both ends a widened portion with bulging portions extending beyond the surface of the narrow central portion and providing a rounded end surface, or wherein the height of the sheets of metal or of the spacers, is smaller than the first outer diameter, wherein the height of the sheets of metal is 0.3-3 mm smaller than the first outer diameter, or wherein the secondary heat exchange pipes comprise a narrow central portion with a diameter in the range of 1.5-2.5 mm, and at both ends a widened portion with bulging portions extending beyond the surface of the narrow central portion and providing a rounded end surface, and wherein the height of the sheets of metal, is essentially the same or smaller than length of the narrow central portion in a direction perpendicular to the plane of the layer, or wherein the secondary heat exchange pipes comprise at least two partition walls running essentially in the plane of the layer in the hollow interior of the secondary heat exchange pipe, separating the flow path in that interior into a central flow-through channel and two end flow-through channels.

23. The gas separation unit according to claim 1, wherein the sheets of metal have a height, measured in a direction perpendicular to the plane of the respective layer, in the range of 7-10 mm, or wherein the sheets of metal are of aluminium or of an aluminium alloy, and have a thickness in the range of 0.2-0.5 mm, or wherein the sheets of metal are of aluminium or of an aluminium alloy, and oscillate between adjacent secondary heat exchange pipes and are soldered and/or welded to the second outer diameter wall in rounded or angular portions of the sheets of metal, and wherein said rounded or angular portions are joined by straight portions of the sheets of metal bridging the interspace between adjacent secondary heat exchange pipes.

24. The gas separation unit according to claim 1, wherein the primary heat exchange pipes are provided as tubes of essentially circular hollow cylindrical shape, having an outer diameter in the range of 10-20 mm, wherein at the side facing the cavity of the respective frame, the primary heat exchange pipes are provided with an array of equally spaced indentations with oblong holes for attaching, soldering and/or welding, the end openings of the respective secondary heat exchange pipes for establishment of a fluid connection of the interior of the primary heat exchange pipe with the secondary heat exchange pipe, and wherein the length of said oblong hole is in the range of 8-15 mm, and essentially corresponds to the first outer diameter of the secondary heat exchange pipe.

25. The gas separation unit according to claim 1, wherein said metal profiles include a core profile, in the form of extruded aluminium sections, which comprises in cross section at least one groove in the top face and/or bottom face running along the full length of the respective core profile, wherein at one top or bottom face a first groove is provided and in the other face a second groove is provided with its opening facing the opposite direction than the first groove, wherein one groove is located closer to the cavity than the other groove, leading to an S-type cross section of the core profile, wherein said grooves are used for directly or indirectly fixing the flexible fabric material layer to the frame construction, and wherein the fixing of the flexible fabric material layer is effected by respective clamping strips inserted into the respective groove and/or by slats attached to the top and/or bottom face of the core profile by means of fixing elements, including rivets interacting with said groove.

26. The gas separation unit according to claim 1,
wherein pairs of adjacent frame structures are provided, at the facing transverse edges contacting in use with in one case a tongue protrusion extending over the full width of the edge, and a corresponding counter profile providing a slot also extending over the full width of the edge, such that by inserting said tongue of one frame into said slot of the adjacent frame the adjacent frame elements are mechanically fixed as well as sealed relative to each other,
wherein said tongue protrusion is realized by means of a correspondingly structured wide slat at the same time used for fixing the flexible fabric material to the corresponding metal profile, or by means of profile elements which wrap-around said core profiles and which comprise first and second arms contacting the top and bottom faces of the core profile as well as a tongue protrusion, or
wherein said counter profile also comprises a slat which at the same time can be used for fixing the flexible fabric material to the corresponding core profile of the adjacent frame or comprises a profile element which wraps around said core profile and which comprises first and second arms contacting the top and bottom faces of the core profiles and an extension providing said slot.

27. The gas s separation unit according to claim 1,
wherein the longitudinal metal profiles are provided with elements for stacking layers,
wherein these elements are provided as grooves opening to the upper and/or lower direction of the respective layer for taking up stack plates or for being shifted into slots in stack plates, and
wherein the stack is constructed by providing a bottom metal sheet with lateral vertical portions and horizontal bottom portion, onto which the respective groove of the lowermost layer is shifted, followed by alternatingly two lateral stack plates and following layers, terminated on top of the stack by a top metal sheet with vertical portions and a horizontal top portion.

28. The gas separation unit according to claim 1,
wherein the unit comprises, in one layer in the range of 40-60 secondary heat exchange pipes running parallel and in one plane,
wherein an upstream half of the secondary heat exchange pipes transports heat exchange fluid from a first side to a second lateral side of the respective layer, and
wherein a downstream half of the secondary heat exchange pipes transports the heat exchange fluid from the second lateral side to the first side.

29. The gas separation unit according to claim 1,
wherein the flexible fabric material is woven or nonwoven textile material, based on polymeric fibres or yarns, respectively, including fibres or yarns, respectively based on PET and/or PE, or the flexible fabric material is made from a cellulose based material, or a paper material, or
wherein the flexible fabric material has a thickness in the range of 0.15-1 mm, or wherein the flexible fabric material, in the form of a polyethylene nonwoven, has an air permeability in the range of 3000-4000 l/m2/s.

30. The gas separation unit according to claim 1,
wherein along the stack of layers the distance between adjacent layers is varied taking account of the pressure drop profile of the inflow,
wherein in case of a central inflow the distance between adjacent layers is set at a given value in the range of 20-100 mm,
wherein the distance of the layers within the stack is gradually increasing outwardly or inwardly, respectively, to a value in the range of 20-100 mm, or
wherein along the stack of layers the angle of the layers to a main horizontal or vertical axis of the unit in case of a central inflow is gradually increasing from a value of around zero at the center to a value in the range of 0.1-5°.

31. The method according to claim 14,
wherein in said first step the primary heat exchange piping, the secondary heat exchange piping, the heat exchange metal sheets, and/or the spacers extending between pairwise adjacent secondary heat exchange pipes, if needed supplemented by further structural elements, are assembled and soldered and/or welded together, to form an assembled structure in a soldering and/or welding furnace, by providing pre-plated construction elements,
wherein in said second step the circumferential metal profiles are attached to said assembled structure, if not already attached in step 1, by soldering and/or welding,
wherein in said third step the bottom fabric layer is attached to the bottom surface,
wherein in said fourth step the loose particulate sorbent material is introduced into the cavity,
wherein in said fifth step the top fabric layer is attached to the top surface, with the proviso that the fourth step can alternatively of as an additional step be carried out after the fifth step,
wherein the bottom and/or top fabric layer is not only attached to the metal profiles but also by way of a plurality of rivets penetrating through both fabric layers and penetrating the layer, and
wherein said rivet connections each comprise a rivet tube and a rivet pin, said rivet tube penetrating through the layer, said rivet tube and rivet pin each being provided with a head being located outside of the fabric layers and/or the bottom and/or top fabric layer and/or by means of gluing and/or heat welding are attached on the respective end faces of the secondary heat exchange pipes.

* * * * *